(12) United States Patent
Kore et al.

(10) Patent No.: US 7,986,701 B2
(45) Date of Patent: Jul. 26, 2011

(54) WIRELESS BUILDING CONTROL SYSTEM BRIDGE

(75) Inventors: Vinayak Sadashiv Kore, Bangalore (IN); Giri Babu Guntipalli, Bangalore (IN); Arun Honnappa, Bangalore (IN); Jingyu He, Beijing (CN)

(73) Assignee: Honeywell International Inc., Morristown, NJ (US)

( * ) Notice: Subject to any disclaimer, the term of this patent is extended or adjusted under 35 U.S.C. 154(b) by 328 days.

(21) Appl. No.: 12/139,148

(22) Filed: Jun. 13, 2008

(65) Prior Publication Data
US 2009/0312853 A1    Dec. 17, 2009

(51) Int. Cl.
*H04L 12/28* (2006.01)
(52) U.S. Cl. ...................................................... 370/401
(58) Field of Classification Search ................... 370/401
See application file for complete search history.

(56) References Cited

U.S. PATENT DOCUMENTS

| | | |
|---|---|---|
| 3,643,183 A | 2/1972 | Geffe |
| 3,715,693 A | 2/1973 | Fletcher et al. |
| 3,758,885 A | 9/1973 | Voorman et al. |
| 4,264,874 A | 4/1981 | Young |
| 4,529,947 A | 7/1985 | Biard et al. |
| 4,812,785 A | 3/1989 | Pauker |
| 5,392,003 A | 2/1995 | Nag et al. |
| 5,430,409 A | 7/1995 | Buck et al. |
| 5,451,898 A | 9/1995 | Johnson |
| 5,481,259 A | 1/1996 | Bane |
| 5,546,301 A * | 8/1996 | Agrawal et al. .............. 700/23 |
| 5,642,071 A | 6/1997 | Sevenhans et al. |
| 5,726,603 A | 3/1998 | Chawla et al. |
| 5,767,664 A | 6/1998 | Price |
| 5,809,013 A | 9/1998 | Kackman |
| 5,847,623 A | 12/1998 | Hadjichristos |
| 5,963,650 A | 10/1999 | Simionescu et al. |
| 6,175,860 B1 | 1/2001 | Gaucher |
| 6,414,963 B1 | 7/2002 | Gemar |

(Continued)

FOREIGN PATENT DOCUMENTS

CH          673184          2/1990

(Continued)

OTHER PUBLICATIONS

Real-Time Communications over Hybrid Wired/Wireless PROFIBUS-Based Networks—Oct. 2002 to Alves et al.*

(Continued)

*Primary Examiner* — Ayaz R Sheikh
*Assistant Examiner* — Hai-Chang Hsiung
(74) *Attorney, Agent, or Firm* — Seager, Tufte & Wickhem LLC

(57) ABSTRACT

A building control system is described that includes a building controller and a bridge. The building controller may control one or more portions of a building control system and may communicate with the bridge over a wired network. The bridge may be coupled to the building controller and may be configured to communicate with other remotely located building controllers via a wireless network. The bridge may provide a link between the wired communication of the local building controller and the wireless communication of the remotely located building controllers. The bridge may include a cache memory for storing data received from remotely located building controllers. In some cases, the data stored in the cache memory may be requested and received in advance of the data being requested by the local building controller.

30 Claims, 20 Drawing Sheets

U.S. PATENT DOCUMENTS

| | | | |
|---|---|---|---|
| 6,578,113 B2 * | 6/2003 | Krishnamurthy et al. | 711/141 |
| 6,901,066 B1 | 5/2005 | Helgeson | |
| 7,149,833 B2 * | 12/2006 | McLeod | 710/300 |
| 2002/0027504 A1 | 3/2002 | Davis et al. | |
| 2003/0229471 A1 * | 12/2003 | Guralnik et al. | 702/182 |
| 2008/0109581 A1 * | 5/2008 | Pham et al. | 710/58 |

FOREIGN PATENT DOCUMENTS

| | | |
|---|---|---|
| DE | 4344172 | 6/1995 |
| EP | 0607562 | 7/1994 |

OTHER PUBLICATIONS

Image-Rejection in Mixers, copyright AAA, 4 pages,1996.

Abidi, "Direct-Conversion Radio Transceivers for Digital Communications," IEEE Journal of Solid-State Circuits, vol. 30, No. 12, 12 pages, Dec. 1995.

Chang et al., "A CMOS Channel-Select Filter for a Direct-Conversion Wireless Receiver," IEEE Journal of Solid-State Circuits, 26 pages, Apr. 1999.

Crols et al., "CMOS Wireless Transceiver Design", Kluwer Academic Publishers,8 pages, 1997.

Lee, "The Design of COMS Radio-Frequency Integrated Circuits," 10 pages, 1998.

Moulding et al., "Gyrator Video Filter IC with Automatic Tuning,", IEEE Journal of Solid-State Circuits, vol. SC15, No. 6, pp. 963-968, Dec. 1980.

Philips, "Advanced Pager Receiver UAA2082," Integrated Circuits, pp. 1-38, Jan. 16, 1996.

Razavi, "Design Considerations for Direct-Conversion Receivers," IEEE Transactions on Circuits and Systems—II: Analog and Digital Signal Processing, vol. 44, No. 6, pp. 428-435, Jun. 1997.

Rofougaran et al., "A 1 GHz CMOS RF Front-End IC for a Direct-Conversion Wireless Receiver," IEEE Journal of Solid-State Circuits, vol. 31, 28 pages, Jul. 1996.

Rofougaran et al., "A 900 MHz CMOS RF Power Amplifier with Programmable Output Power", Proceedings VLSI Circuits Symposium, Honolulu, 23 pages, Jun. 1994.

Wilson et al., "A Single-Chip VHF and UHF Receiver for Radio Paging," IEEE Journal of Solid State Circuits, vol. 26, No. 12, pp. 1944-1950, Dec. 1991.

Ferriera et al., "Hybrid Wired/Wireless PROFIBUS Networks Supported by Bridges/Routers," 4th IEEE International Workshop on Factory Communication Systems, pp. 193-202, Aug. 28-30, 2002.

Reinisch et al., "Wireless Technologies in Home and Building Automation," IEEE, pp. 93-98, 2007.

* cited by examiner

WIRELESS BUILDING CONTROL SYSTEM BRIDGE

FIELD

This disclosure generally relates to building control systems, and more particularly, to building control systems that include a wireless network.

BACKGROUND

Many modern building control systems, or building automation systems (BAS), often include a number of building controllers that monitor and control the mechanical, lighting and/or other systems of a building. The building controllers are often application specific controllers, or embedded building controllers, that are adapted to control a particular function and/or region of a building. In some cases, a supervisory controller is connected to various building controllers to provide supervisory or system level control to the various building controllers.

The building controllers often "talk" or communicate with each other and/or one or more building components such as sensors, dampers, switches, etc., over a building control network. In many building control systems, the building control network is a wired network using a wired network communication protocol such as BACnet (MS/TP), LON, CBUS, etc.

SUMMARY

It has been recognized that, in some applications, wireless communication may provide some advantages over a strictly wired (e.g. networked) building control system. For example, wireless communication may provide lower installation costs, reduced commissioning time, eased retrofitting tasks, as well as others advantages. In some cases, it may be desirable to use a wired network for some parts of the building control system, and a wireless network for other parts. Difficulties can arise when combining a wired network and a wireless network in a building control system. For example, building controllers that are configured to communicate over a wired network, but whose messages must pass across a wireless network portion of the building control system, often are subject to timing constraints that can be difficult to meet because of reduced speed, bandwidth, network collisions and other factors associated with the wireless network.

This disclosure relates to providing building control systems that include both a wired network portion and a wireless network portion. In one illustrative embodiment, a building control system is provided that includes a first building controller connected to a first bridge. The first building controller may be configured to communicate with the first bridge over a wired network using a wired communication protocol. To support wireless communication, the first bridge may be configured to convert the wired communication from the first building controller to wireless communication across the wireless network portion. In some cases, a second bridge may be connected to a second building controller via a wired network, and may communicate with the first bridge over the wireless network. The first and second building controllers may be any sort of building controllers, such as application specific controllers, or embedded building controllers, which are adapted to control a particular function and/or region of a building, and/or may be controllers that are adapted to control a particular device or subsystem such as a damper, valve, ventilation system or the like.

In some cases, the first bridge may include a cache memory for storing information received from the second building controller across the wireless network portion. The second building controller may send certain information to the first bridge via the second bridge and the wireless network, before the first bridge requests the information. The information may be stored in the cache memory of the first bridge. When the first building controller later requests certain information from the second building controller, and the first bridge may read the requested information directly from its own cache memory and supply the requested information to the first building controller in a manner that consistent with the timing requirements of the wired network that extends therebetween. If the requested information is not present in the cache memory of the first bridge, the first bridge may request the information from the second building controller via the wireless network.

In some cases, the first bridge may be configured to automatically receive periodic updates of certain information from the second building controller, and store the updated information in its cache memory. The periodic updates may be at a learned interval based on, for example, a time interval between previous requests made for the information by the first building controller. In some cases, the second bridge may only send the updated information to the first bridge if the information has changed by a threshold amount, which may help reduce the bandwidth load on the wireless network.

This summary is provided to facilitate an understanding of some of the innovative features unique to the present invention and is not intended to be a full description. A full appreciation of the invention can be gained by taking the entire specification, claims, drawings, and abstract as a whole.

BRIEF DESCRIPTION

The invention may be more completely understood in consideration of the following detailed description of various illustrative embodiments of the invention in connection with the accompanying drawings, in which.

DETAILED DESCRIPTION

Figure 1:
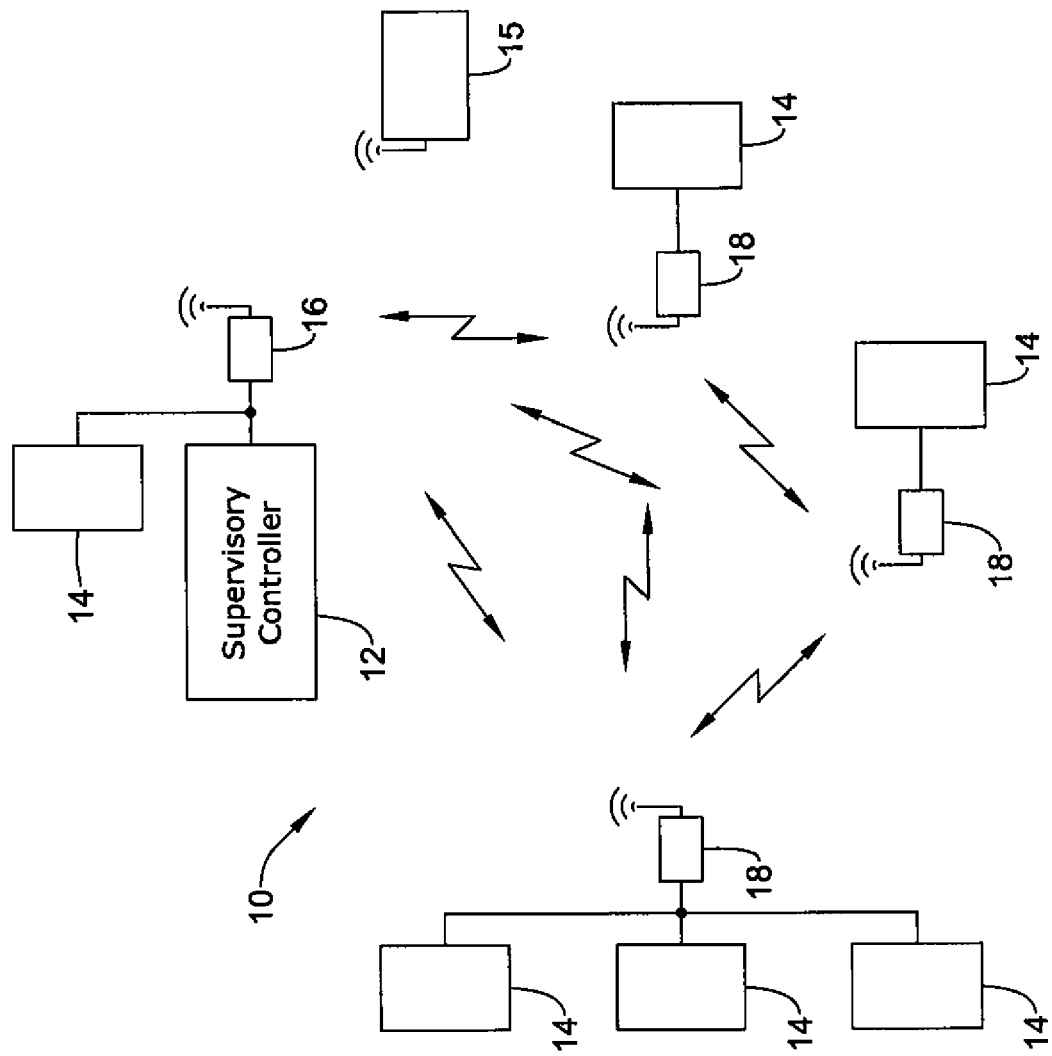
FIG. 1 is a schematic diagram of a combination wired and wireless building automation system network 10.

The following description should be read with reference to the drawings wherein like reference numerals indicate like elements throughout the several views. The detailed description and drawings show several embodiments which are meant to be illustrative of the claimed invention.

FIG. 1 is a schematic diagram of an illustrative embodiment of a combination wired and wireless building automation system network 10. In the illustrative embodiment, the network 10 may be a network that can facilitate the monitoring and control of mechanical, lighting, security and/or other systems of a building. In some cases, part of the network 10 may operate in accordance with a wired communication protocol, and another part of the network 10 may operate in accordance with a wireless protocol. In one example, the wired portion of the network 10 may operated in accordance with a wired network communications protocol such as, for example, the Building Automation and Control NETwork (BACnet) protocol, a master-slave/token-passing (MS/TP) protocol, LON, CBUS, ModBus, or any other suitable wired network protocol, as desired. The wireless portion of the network 10 may operate in accordance with a wireless communication protocol such as, for example, cellular communication, ZigBee, Bluetooth, WiFi, IrDA, dedicated short range communication (DSRC), EnOcean, or any other suitable wireless protocols, as desired.

In the illustrative embodiment, the network 10 may include a supervisory controller 12, one or more source building controllers 14, a supervisory bridge 16 coupled to the supervisory controller 12, one or more source bridges 18 coupled to the one or more source building controllers 14, and/or one or more integrated wireless building controllers 15. The supervisory controller may be considered a building controller. The building controllers may be any sort of building controller, such as an application specific controller, or embedded building controller, which is adapted to control a particular function and/or region of a building, and/or may be controllers that are adapted to control a particular device or subsystem such as a damper, valve, ventilation system or the like.

In one example, the supervisory controller 12 and the one or more building controllers 14 may be configured to operate according to a wired communication protocol. When so provided, the supervisory controller 12 may communicate with the supervisory bridge 16 and/or building controllers 14 connected to the supervisory controller 12 via a bus using a suitable wired communication protocol, and the one or more source bridges 18 may communicate with their respective building controllers 14 using a suitable wired communication protocol. The supervisory bridge 16 and the one or more source bridges 18 may communicate with each other using a suitable wireless communication protocol. It is contemplated that the supervisory bridge 16 may be integrated with or separate from the supervisory controller 12, and the one or more source bridges 18 may be integrated with or separate from the corresponding building controllers 14 forming the integrated wireless controller 15, as desired.

In the illustrative embodiment, the supervisory controller 12 may include a building controller, such as, for example, a heating, ventilation, and air conditioning (HVAC) controller, a security system controller, a lighting system controller, a fire system controller, a power management controller, and/or any other suitable type of building controller, as desired. The supervisory controller 12 may monitor and/or control the one or more remote building controllers 14 by communicating through the supervisory bridge 16 and the one or more source bridges 18. In some cases, the supervisory controller 12 may control the one or more remote building controllers 14 at a supervisory level. Example HVAC related building controllers 14 may include, but are not limited to, HVAC zone controllers, humidity controllers, ventilation controllers, damper controllers, valve controllers, sensor controllers, AC units, and heating units (i.e. boilers, furnaces, etc.). Example security building controllers 14 may include, but are not limited to, security zone controllers, lighting controllers, detectors (i.e. motion, fire, smoke, glass, etc.), alarms, and cameras. Example lighting building controllers 14 may include, but are not limited to, lighting zone controllers, timers, occupancy sensors, and light fixtures. Example fire building controllers 14 may include, but are not limited to, fire zone controllers, detectors (i.e. smoke, heat, air quality, etc.), alarms, and sprinklers.

In the illustrative embodiment, each of the supervisory bridge 16 and the one or more source bridges 18 may include a receiver and/or a transmitter for supporting wireless communication, using any suitable wireless communication protocol. In some cases, the one or more source bridges 18 may be allocated one or more time slots for transmission on the wireless network, which in some cases, may help reduce collisions on the wireless network, but this is not required. One suitable method for assigning and/or allocating time slots to the one or more source bridges 18 is described in U.S. Pat. No. 6,901,066 to Helgeson, entitled "Wireless Control Network with Scheduled Time Slots", which is incorporated herein by reference. In other embodiments, the one or more source bridges 18 may be configured to transmit at any suitable time, as desired.

In some cases, the bridges 16 and 18 may help enable controllers 12, 14, and/or 15 to operate efficiently over a wireless network to implement intended control functionality for the building. In some cases, this may be performed in spite of bandwidth limitations and latencies of the wireless network.

As illustrated in FIG. 1, the supervisory bridge 16 may be connected to one or more building controllers 14 via a wired connection. In this case, the supervisory bridge 16 may support communication between the one or more wired building controllers 14 and the remote building controllers 14. The supervisory bridge 16 may maintain an Active Device List to separate the wired building controllers 14 and the wirelessly connected building controllers 14. Furthermore, it is to be understood that some of the functions of the supervisory bridge 16 described below with reference to a source bridge, may be implemented in operation with the wired building controllers 14, such as for example, the learning mechanism, caching, virtual COV, virtual token passing, as well as any other function, as desired.

Figure 2:
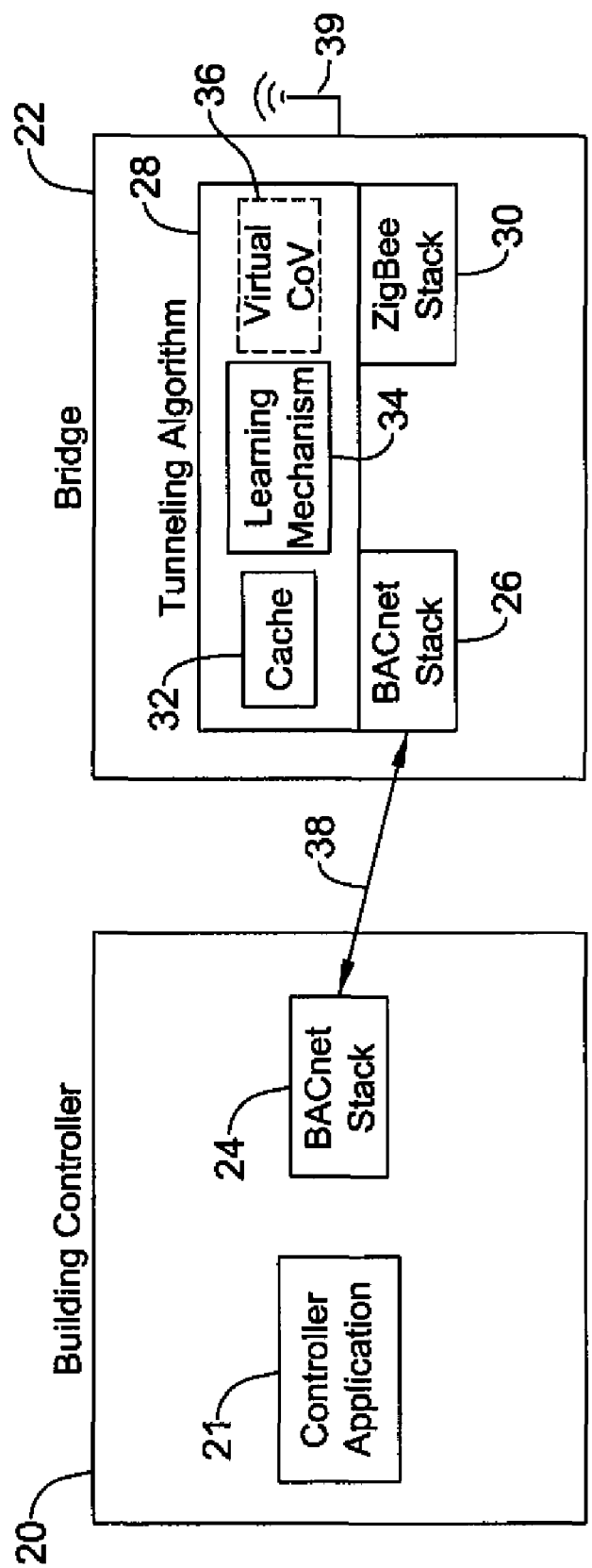
FIG. 2 is a schematic diagram of an illustrative embodiment of a building controller coupled to a bridge.

FIG. 2 is a schematic diagram of an illustrative building controller 20 coupled to a bridge 22. In the illustrative embodiment, the building controller 20 may be a supervisory controller such as supervisory building controller 12, a building controller such as building controller 14, or any other suitable building controller or component, as desired. The bridge 22 may correspond to supervisory bridge 16 or source bridge 18, as desired.

In the illustrative embodiment, the building controller 20 may include a controller application block 21 and a wired communication protocol stack, such as, for example, a BACnet stack 24. The controller application block 21 may be configured to monitor and/or control one or more systems, sub-systems and/or components of a building. In operation, the controller application block 21 may send messages to other building controllers. The messages may include requests for properties or other information or values from building controllers or components, and/or may include control signals to control the operation of one or more building controllers and/or components. Example BACnet messages may include, but are not limited to ReadProperty, ReadPropertyMultiple, ReadPropertyConditional, WriteProperty, WritePropertyMultiple, CreateObject, DeleteObject, AddListElement, RemoveListElement, as well as other BACnet messages and/or requests, as desired. The BACnet stack 24 may receive the messages from the controller application block 21, and may configure the messages according to the BACnet protocol. The BACnet stack 24 may then transmit the message over line 38 to the bridge 22. The BACnet stack 24 may also be configured to receive messages, such as, for example, responses to requests, from the bridge 22 and then configure the messages and/or relay the message to the controller application block 21.

In the illustrative embodiment, the BACnet protocol may be based on a four-layer architecture that corresponds to the physical, data link, network, and application layers of the Open Systems Interconnection (OSI) model. In some cases, the BACnet stack 24 may include these four layers, as desired. The application layer and the network layer may be defined according to the BACnet standard, such as, for example, ASHRAE Standard 135. The BACnet stack 24 may include a number of options that may correspond to the OSI data link layer and physical layer. The options may include ISO 8802-2 Type 1, ISO 8802-3, ARCNET, MS/TP, PTP, EIA-485, EIA-232, and LonTalk. In the illustrative example, the BACnet stack may include the MS/TP layer and the EIA-485 layer, but this is merely illustrative.

In the illustrative embodiment, the bridge 22 may include a BACnet stack 26, a tunneling algorithm 28, and a ZigBee stack 30. In some cases, the bridge 22 may be configured to communicate with the building controller 20 and any other wired controller over a wired network or line 38 using the BACnet protocol (i.e. via BACnet stack 26), and with one or more remotely located building controllers over a wireless network using the ZigBee wireless protocol (i.e. via ZigBee stack 30). These communication protocols are merely illustrative and are not meant to be limiting in any manner.

In some cases, the BACnet stack 26 may be configured to transmit and/or receive messages and/or other communications to and from the BACnet stack 24 of the building controller 20 over wired network or line 38. In some cases, the BACnet stack 26 may be configured to transmit and/or receive messages and/or other communications to and from wired building controllers (for example, wired controller 14 of FIG. 1) over line 38. The ZigBee stack 30 of the bridge 22 may be configured to transmit and/or receive messages or other communications to and from one or more remotely located building controllers via the wireless network by way of antenna 39.

In the illustrative embodiment, the tunneling algorithm 28 of the bridge 22 may be configured to perform protocol translation (i.e. convert the wired communication protocol to the wireless communication protocol and visa versa) and network wide information exchange management of the bridge 22. In some cases, the tunneling algorithm 28 may implement several systems or methods to help control the bandwidth requirements of the building controller 20 over the wireless network. The tunneling algorithm 28 may also include methods to help satisfy timing and latency requirement of the building controller 20, if desired. For example, the tunneling algorithm 28 may include a cache 32, a frequently polled property buffer (not shown) often implemented as part of the cache 32, a learning mechanism 34, a virtual change of value (COV) mechanism 36, a virtual token passing algorithm, as well as other mechanisms and/or algorithms as desired, which are discussed further below.

In the illustrative embodiment, the cache 32 may include a collection of data duplicating original values stored elsewhere on the building control network. The cache 32 may be periodically updated by messages received from the one or more remotely located and/or wired building controllers. In some cases, the cache 32 may include a frequently polled property buffer that stores values of frequently requested or polled properties (in BACnet terminology, a parameter of a BACnet device is called a property) by the building controller 20. For example, in some cases, the cache 32 may be used to more quickly respond to messages received from the building controller 20 without having to first wirelessly transmit a request to one or more of the remotely located building controllers. In some cases, messages, such as for example, application level request and response messages, may be converted to the wireless communication protocol and transmitted over the wireless network.

In operation, the BACnet stack 26 may receive a message from the building controller 20 expecting a reply message. If the message received is a ReadProperty or ReadPropertyMultiple frame request, the tunneling algorithm 28 may search the cache 32 or frequently polled property buffer to try and locate the requested data. If the requested data is located in the cache 32, the tunneling algorithm 28 may respond to the message with a message via the BACnet stack 26 including the cached data. If however, the requested data is not located in the cache 32, the tunneling algorithm 28 may translate the message into a ZigBee protocol message. The translated message may then be sent to the ZigBee stack 30 and transmitted over the wireless network via antenna 39. In some cases, the tunneling algorithm 28 may include an Active Device List (not shown), and may check whether the destination building controller is active on the wireless network. If the destination building controller is not found to be active on the wireless network, the message may be dropped.

In some cases, the learning mechanism 34 may be configured to monitor the time intervals between messages or requests from the building controller 20. The learning mechanism 34 may monitor the time intervals of the building controller 20 and may determine an interval between requests for a particular property or parameter and/or for a particular building controller that is connected to the wireless network. In some cases, this determined request interval may be passed to the ZigBee stack 30 to send to one or more appropriate remotely located bridges and/or building controllers so that the building controllers can be prompted to send a message including updated data before the next corresponding expected request by the building controller 20. The learning mechanism 34 may learn an expected requests interval for each of the building controllers that are connected via the wireless network and/or each of parameter, if desired.

In some cases, such as for example, when the bridge 22 is a remotely located source bridge, the bridge 22 may include the virtual COV 36, which may be an event based communication mechanism. In some cases, an event may correspond to a change in a sensed value by a threshold amount. When an event is detected, the source bridge 22 may send a message including the updated value to the ZigBee stack 30 for transmission over the wireless network. If however, an event is not detected, the bridge 22 may not send the message. In some cases, this may significantly reduce the bandwidth load on the wireless network by only sending data when an event is detected.

Figure 3:
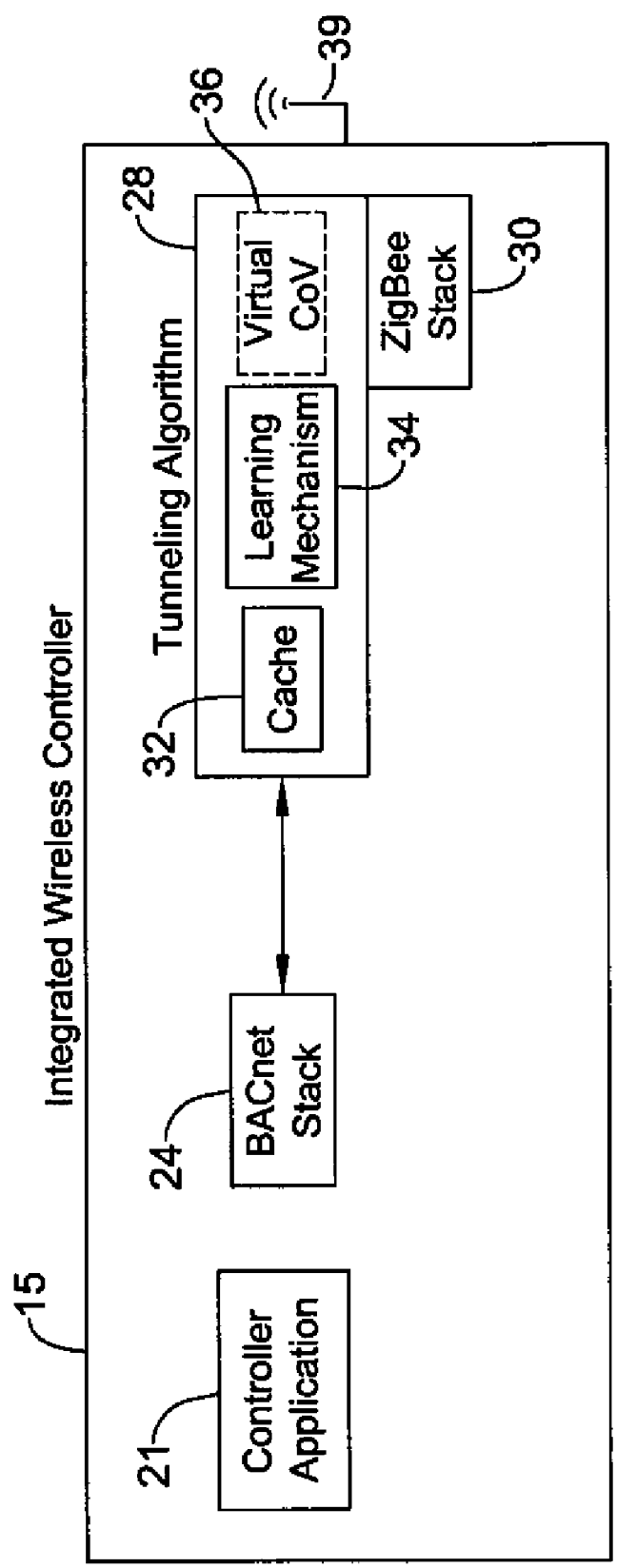
FIG. 3 is a schematic diagram of an illustrative embodiment of an integrated wireless controller.

FIG. 3 is a schematic diagram of an illustrative embodiment of an integrated wireless controller 15. Similar to FIG. 2, the wireless controller 15 may be an integrated implementation of the building controller 20 and bridge 22. As shown, the BACnet stack 24 may use the ZigBee stack 30 to directly transmit the messages wirelessly via antenna 39. The ZigBee stack 30 along with the tunneling algorithm 28 may operate as a data link layer for the BACnet stack 24.

In some embodiments, software modules on the bridge 22 of FIG. 2 are integrated with the controller 20, as shown in wireless controller 15 in FIG. 3. In this configuration, the tunneling algorithm 28 may receive the BACnet messages directly from Network (NWK) layer of the BACnet stack 24. Similar to above embodiments, the tunneling algorithm 32 can be configured to learn the periodicity of requests with learning mechanisms 34. Tunneling algorithm may also include cache 32, virtual COV 36, and other function discussed previously, to help reduce the bandwidth requirement on the wireless network.

As discussed previously, BACnet and ZigBee are shown merely for illustrative purposes and are not meant to be limiting in any manner. It is contemplated that any suitable wired protocol other than BACnet and any suitable wireless protocol other than ZigBee may be used, as desired.

Figure 4:
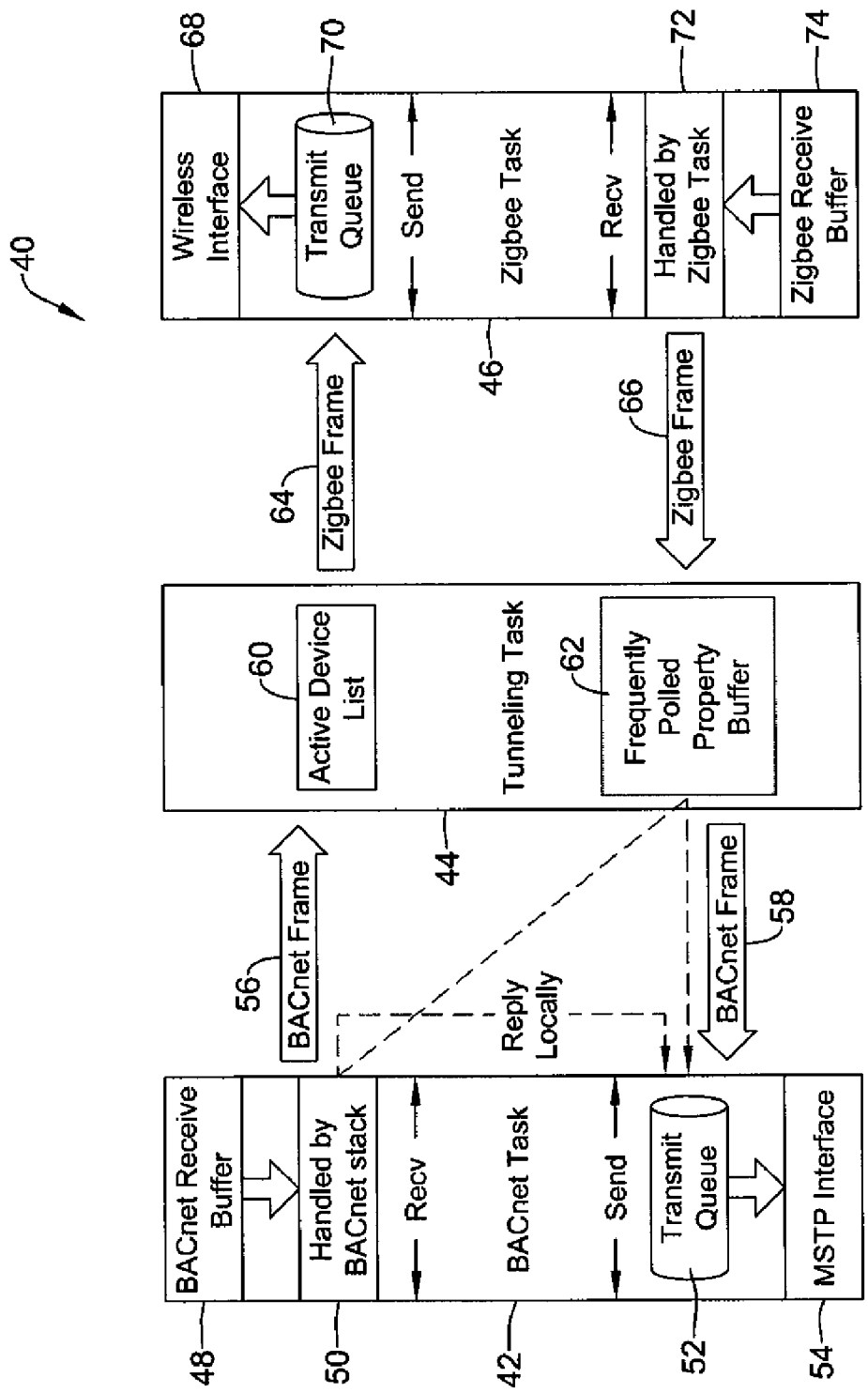
FIG. 4 is a schematic diagram of an illustrative procedure of handling messages by an illustrative bridge.

FIG. 4 is a schematic diagram of an illustrative procedure of handling messages by an illustrative bridge 40. In the illustrative embodiment, the bridge 40 may include a BACnet task block 42, a tunneling task block 44, and a ZigBee task block 46. In some cases, BACnet task block 42 may be similar to BACnet stack 26 of FIG. 2, tunneling task block 44 may be similar to tunneling algorithm 28 of FIG. 2, and ZigBee task block 46 may be similar to ZigBee stack 30 of FIG. 2.

In the illustrative embodiment, the BACnet task block 42 may be used by the tunneling algorithm 28 to respond to BACnet commands or requests issued by a wired building controller or device, such as, for example, BACnet network frames and application layer requests. In some cases, the BACnet task block 42 may locally handle MS/TP MAC messages and/or other messages received from the BACnet device that may have short response times. In some cases, the BACnet tasks may also include locally handling a token passing mechanism, decoding and/or interpreting BACnet device messages for the tunneling task block 44, sending the messages coming from tunneling task block 44 to the building controller in BACnet format, as well as other tasks, as desired.

In the illustrative embodiment, the tunneling task block 44 may be configured to perform tunneling tasks including, but not limited to, fragmentation and/or de-fragmentation, device discovery and Active Device List maintenance, address mapping, proxy rest of the devices of the network, information exchange management, as well as other tasks, as desired. The fragmentation and/or de-fragmentation may include translating BACnet messages into ZigBee messages and ZigBee messages into BACnet messages. In some cases, the maximum packet lengths supported on BACnet and ZigBee networks may be different, as such, for example, longer BACnet frames may be fragmented by tunneling task on a source bridge and de-fragmented by tunneling task on a receiving bridge (e.g. supervisory bridge). In some cases, the fragmentation and/or de-fragmentation may also remove portions or fields of a message that may not be necessary in the outgoing communication protocol.

In some cases, the device discovery and Active Device List maintenance may include maintaining a list of BACnet and ZigBee address of all online and/or active building controllers of the building control network in an Active Device List 60. This list may be updated or modified as new devices are discovered and as old devices go off-line. Also, in some cases, address changes of the online devices may be reflected in the device list. Address mapping may include exchanging the messages or frames between the media with appropriate address translation.

In some cases, a proxy of the devices of the network may include the bridge making the attached building controller act as if it were connected to other devices over BACnet. The bridge may proxy for the wirelessly connected building controllers, and may handle MAC level messages locally on their behalf. Information exchange management may include the bridge managing information exchange in a way to reduce wireless traffic, meet timing requirements of application and protocol requests, and maintaining freshness of the information. In some cases, this task may implement the cache (discussed above) including the frequently polled property buffer 62 and procedures such as, for example, the virtual COV.

In the illustrative embodiment, the ZigBee task block 46 may be configured to perform ZigBee communication tasks. In some cases, the ZigBee communication tasks may include, but are not limited to, handling the transmission and reception of messages over the wireless network and implementing intelligent channel sharing mechanisms (e.g. time slotted communications, etc.) over a ZigBee network to reduce collisions and increase network throughput. In some cases, upon receiving a message from the wireless network, the ZigBee task block 46 may send the message to the tunneling task block 44 for processing.

In operation, the BACnet Receive Buffer 48 may receive a request, message, and/or command, sometimes called a frame, from the BACnet device over a wired network. The request, message, and/or command may be passed to the BACnet stack to be handled, shown in block 50. The BACnet stack 50 may determine if the request, message, and/or command is to be responded locally by the BACnet task block 42 or if the request, message, and/or command is to be delivered to the tunneling task block 44 for processing. If the request, message, and/or command is a MAC level message with a short timeout, it may be handled by the BACnet task block 42.

The tunneling task block 44 may determine if the request, message, and/or command can be handled locally, such as, for example, by using the frequently polled property buffer 62 of the cache. When the requested data is located in the frequently polled property buffer 62, a response message may be sent to transmit queue 52. In the transmit queue 52, the response message may be passed to the MS/TP interface 54 for transmission to the requesting controller or device across the wired network or line.

If it is determined that the request, message, and/or command cannot be handled locally, the tunneling task block 44 may perform address mapping of the message or, in other words, determine the address of the device to receive the request, message, and/or command, by using the Active Device List 60. In some cases, the tunneling task block 44 may also translate the request, message, and/or command from BACnet protocol to ZigBee protocol. Once mapped and translated, the tunneling task block 44 may send the request, message, and/or command over ZigBee frame 64 to the ZigBee task block 46. The ZigBee task block 46 may send the translated request, message, and/or command to transmit queue 70. Once in the transmit queue 70, the request, message, and/or command may be passed to wireless interface 68 to be transmitted to the appropriate building controller or device over the wireless network.

When the bridge 40 receives a transmission from a building controller or device on the wireless network, the transmission may be received at ZigBee Receive Buffer 74 of the ZigBee task block 46. The transmission may then be handled by the ZigBee task 72. The transmission may be sent via ZigBee frame 66 to the tunneling task block 44. In some cases, the transmission may update the frequently polled property buffer 62 and/or the Active Device List 60. In some cases, the tunneling task block 44 may convert the ZigBee transmission to the BACnet protocol, and send the transmission to the BACnet task block 42 via BACnet frame 58. In the BACnet task block 42, the message may be placed in the transmit queue 52. Then, the message may be sent to the attached wired building controller via the MS/TP interface 54.

Figure 5:
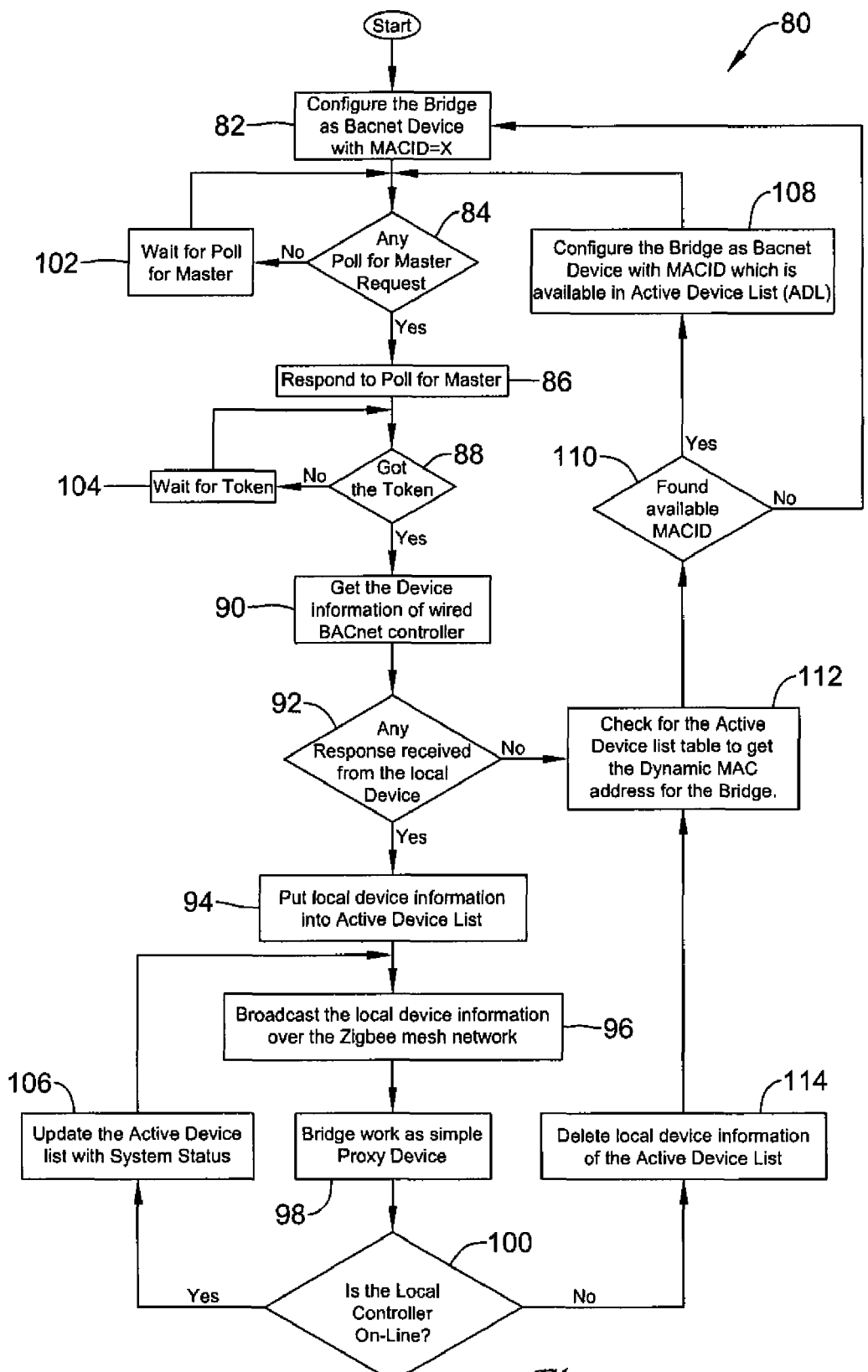
FIG. 5 is a flow diagram of a device discovery procedure of an illustrative bridge.

FIG. 5 is a flow diagram of a device discovery procedure 80 of an illustrative bridge. In the illustrative embodiment, the device discovery procedure 80 may be used to discover building controllers, bridges and other components that are currently online. The discovered device information may be stored in a cache to be used for address mapping, online list maintenance, and communication, as well as any other tasks, as desired.

When the device discovery procedure starts, in block 82, the bridge may be configured as a BACnet device having a MAC ID equal to "X", where "X" is any suitable MAC ID. In some cases, the MAC ID may be a BACnet address or a temporary address. The MAC ID may help the bridge communicate with the attached (i.e. wired) building controller and/or other devices. In some cases, acting as a BACnet device, the bridge may discover the device information of the attached building controller and/or other devices through a MS/TP connection.

With the MAC ID, in block 84, the bridge may listen to the connected BACnet devices, such as, for example, a supervisory controller or other building controller, for a Poll for Master request. If there is no Poll for Master request from the attached BACnet device(s), the procedure moves to block 102, where the bridge waits for a Poll for Master request. Periodically, the bridge may move to block 84 to check to see if there is a Poll for Master requests. If there is a Poll for Master request, the bridge may then send a Respond to Poll for Master signal, in block 86. However, this is merely illustrative and is not required.

In decision block 88, the bridge may check to see if the attached building controller and/or other devices have sent the bridge a token. A token may allow the bridge to initiate, for example, read and write messages. If the bridge did not receive a token in block 88, then in block 104, the bridge may wait for the token. If the bridge did receive a token in block 88, then, in block 90, the bridge may get the device information of the wired BACnet controller and/or other devices. In some cases, to get the device information, the bridge may send a "Who-Is" request to the wired controller and/or other devices and wait for an "I-Am" response. Alternatively, or in addition, the bridge may send one or more read property requests, such as, for example, Device object's Object Identifier, Vendor_ID, Segmentation_Supported, Max_APDU_size, System_Status, Protocol_Services_Supported, to obtain the device information.

After the device information has been obtained, the bridge may move to decision block 92 to determine if any responses have been received from the local building controllers. If no response has been received from the local building controllers, the bridge may move to block 112 to check the Active Device List for the dynamic MAC address for the bridge. If a response has been received from the local building controllers, the bridge may write the local device information into the Active Device List, as shown in block 94. In some cases, bridge may register the received device information of the attached or local building controller in the first slot of the Active Device List, but this is not required in all embodiments.

In block 96, the bridge may broadcast the local device information over the wireless network. In some cases, the bridge may broadcast the local device(s) information at regular intervals of time in health messages so that it may be registered as an active device(s) by other bridges or devices. In some cases, after this stage, the bridge may be configured to operate as a transparent BACnet node and represent the building controller on wireless network.

In block 98, the bridge may be configured to operate as a proxy device for the attached building controller and/or other devices. In decision block 100, the bridge may check the online status of the attached building controller and/or other devices. If the attached building controller and/or other devices are online, the bridge may send a Poll for System Status message. If the building controller and/or other devices are online and the bridge receives a response, then, in block 106, the bridge may update the Active Device List with the system status. The bridge may then rebroadcast the local device information over the wireless network, as shown at block 96. With this loop, the bridge may be configured to periodically monitor the status of the local building controller and/or other devices and their current address. Changes to the current status and/or address may be reflected in the Active Device List, and in some cases, almost immediately, and in a following broadcast health messages, if desired.

If the wired building controller and/or other devices are found to be offline, then, in block 114, the bridge may delete the local device information from the Active Device List. Also, in some cases, if the local building controller and/or other devices are found to be offline, other bridges may be informed of the status and the health messages may be discontinued until the device comes online again.

After the local building controller and/or other devices are removed from the Active Device List, the bridge may get a MAC address for itself from the Active Device List, as shown in block 112. Then, in decision block 110, the bridge may determine if a MAC ID is available in the Active Device List. If a MAC ID is found, then, in block 108, the bridge may be configured as a BACnet device with the MAC ID. If there is no MAC ID available in the Active Device List, then the bridge moves to block 82 and configures the bridge as a BACnet device with MAC ID equal to X as shown at block 82.

Figure 6A:
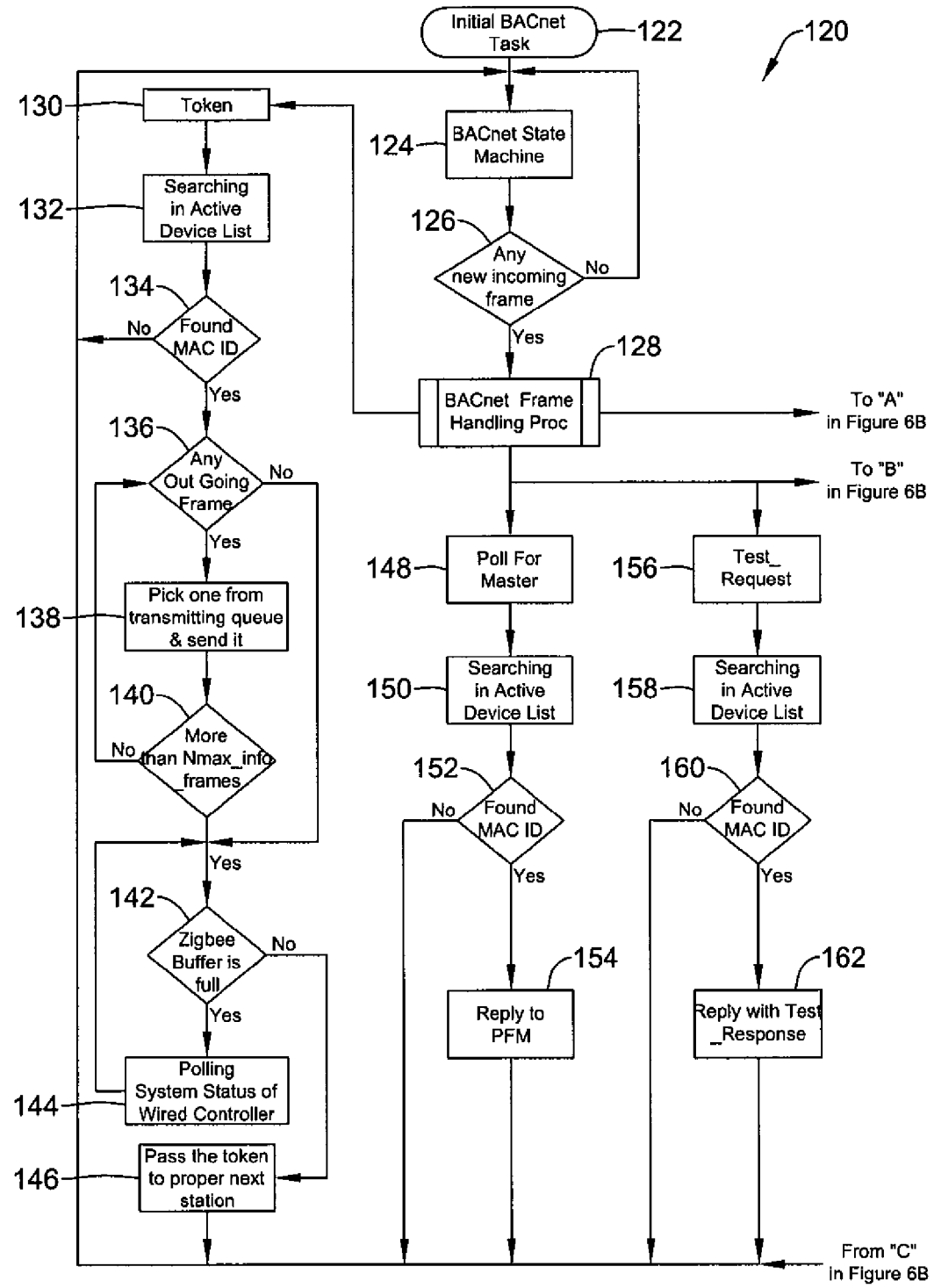
FIGS. 6A and 6B show a flow diagram of an illustrative method of performing BACnet tasks in the bridge.
Figure 6B:
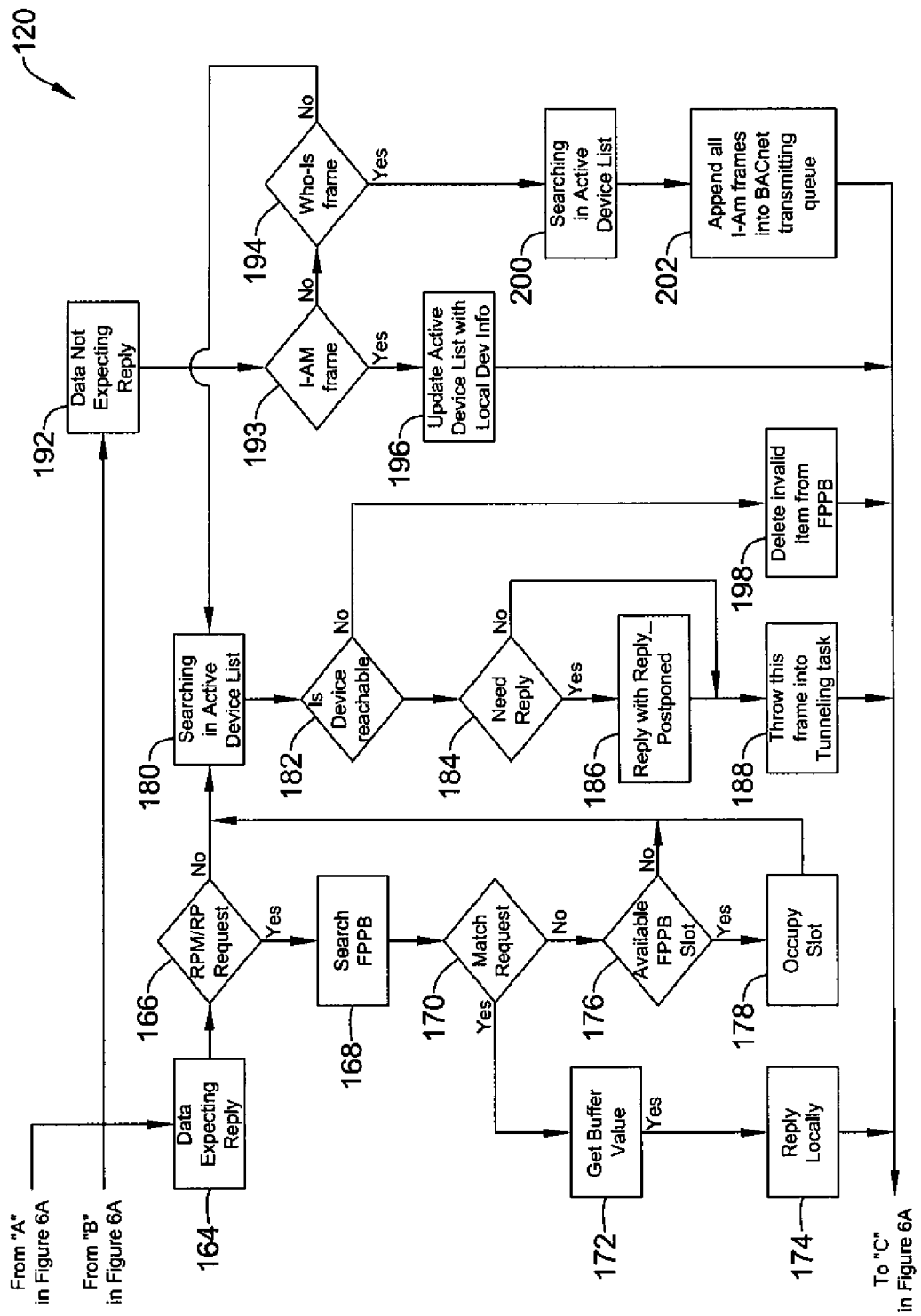

FIGS. 6A and 6B show a flow diagram of an illustrative method of performing BACnet tasks in the bridge. In the illustrative flow diagram, the bridge may be configured to handle a number of requests locally, rather than having to first communicate with a remotely located building controller and/or other device over the wireless network. For example, the bridge may handle the following frames: Token; Poll For Master; Reply To Poll For Master; Test_Request; Test_Response; BACnet Data Expecting Reply; BACnet Data Not Expecting Reply; and Reply Postponed. However, this list of frames is not meant to be limiting and it is contemplated that any suitable frames may be responded locally, as desired.

In the illustrative flow diagram generally shown at 120, the bridge may initiate a BACnet task, as shown at block 122. The bridge may enter the BACnet state machine of block 124. In block 126, the bridge may determine if there are any new incoming frames. If not, the bridge may return to block 124. If there are new incoming frames, the bridge goes to block 128 to determine the BACnet handling procedure for the frame.

If the frame is a Token, then the bridge moves to block 130. A token may be used to control access and fair sharing among devices. In some cases, a token receiving node may need to respond within 10 milliseconds to 200 milliseconds, or any other time, depending on the BACnet standard for the application. If the receiving node does not respond within the time period, the token-sending node may treat the token as lost and generate a new token. In some cases, due to the short response time, the bridge may be configured and designed to locally respond to the token frames, rather than having to first communicate with a remotely located building controller and/or other device over the wireless network.

In block 132, the bridge may search the Active Device List to match the destination MAC ID of the token frame. In decision block 134, the bridge may determine if the MAC ID was found in the Active Device List. If the MAC ID was not found, then the bridge abandons the request. If the MAC ID is found in the Active Device List, then in decision block 136, the bridge determines if there are any outgoing frames. If there are no outgoing frames, the bridge moves to block 142. If there are outgoing frames matching the MAC ID found, the bridge may pick an outgoing frame from the transmit queue and send it to the local building controller. Then, in decision block 140, the bridge may determine if the number of frames being transmitted is more than Nmax_info_frame. If the bridge determines there is not, then the bridge loops back to block 136. If there is, then the bridge moves to block 142.

In decision block 142, the bridge determines if the ZigBee buffer is full. If the ZigBee buffer is not full, then the bridge moves to block 146 and passes the token to the proper next building controller. If the next controller is a remote (wirelessly connected) controller, the token is virtually passed within the bridge and any pending response data available from the corresponding remote controller is sent to the wired controller. If the ZigBee buffer is full, then, in block 144, the bridge polls the system status of the local wired building controller. The bridge then loops back to block 142. This may be done to help keep the token for some duration so as to free the ZigBee buffers. If the token is immediately released, the wired controller may send more data, which may not be transmitted on the wireless network without having free ZigBee buffers. In essence, if there are any messages pending in the buffer from the matching building controller, those are sent to the local building controller before passing the token to the next building controller or device in the list.

Returning to block 128, if the frame is a poll for master, the bridge moves to block 148. The poll for master frame may be transmitted by master nodes during configuration and periodically during normal network operation. In some cases, the poll for master frame may be used to discover the presence of other master nodes on the network and to determine a successor node in the token ring, if desired.

In block 150, the bridge may search the Active Device List for the MAC ID of the poll for master sender. If the MAC ID is found in decision block 152, then in block 154, the bridge may respond to the poll for master (PFM). If the MAC ID is not found in decision block 152, then bridge may abandon the task.

In this task, the bridge may use a broadcast health message based device discovery over the wireless ZigBee network and maintain the Active Device List using the same mechanism. In this case, the poll for master message may not be sent over wireless network, but instead, the bridge may respond to the poll for master message from the local building controller by using the entries in the Active Device List.

In some cases, the response to a poll for master request may be a reply to poll for master frame. In some cases, this frame may be used to indicate that the node sending the frame wishes to enter the token ring. Additionally, in some cases, the poll for master frame should be replied to by the receiving node within a time periods, such as, for example, 100 milliseconds. In some cases, the bridge may generate a reply to poll for master frames, as shown at block 154, for all devices in its Active Device List, but this is not required in all embodiments.

If the frame is a Test_Request frame, the bridge moves to block 156. The Test function may provide a facility to conduct loopback tests of the MS/TP to MS/TP transmission path. Successful completion of the test may include sending a Test_Request PDU with a particular information field to the designated destination and receiving, in return, the identical information field in a Test_Response PDU.

To perform this test, the bridge may search the Active Device List for the sending node, as shown at block 158. If the MAC ID of the destination is found in the Active Device List, in decision block 160, the bridge may respond to the Test_Request message with a Test_Response message, as shown at block 162. In some cases, the response may return the identical information field that was received. If the MAC ID of the destination is not found in Active Device List, then the bridge may abandon the task. In other cases, if the MAC ID is not found, the receiving node may discard the packet.

In either case, the Test_Response frames may need to be responded to within a period of time, such as, for example, 250 milliseconds. In some cases, these frames may be handled locally by the bridge in order to meet the timing requirements.

If the frame is a Data Expecting Reply frame, the bridge may move to block 164, shown in FIG. 6B. In some cases, the Data Expecting Reply frame may be a confirmed application service based on a client-server communication model. In this model, a client may request a service from a server via a particular service request instance. The server may provide the service to a client and responds to the request. In this model, the client may be the requesting BACnet building controller and the server may be the responding building controller.

In decision block 166, the bridge may determine if the frame is a ReadProperty (RP) or a ReadPropertyMultiple (RPM) frame. If the frame is a ReadProperty or a ReadPropertyMultiple frame, the bridge may move to block 168 and search the frequently polled property buffer (FPPB) of the cache memory of the bridge for the property. If, in decision block 170, the property is found in the cache memory of the bridge, or the request is matched, then, in block 172, the bridge may get the value from the frequently polled property buffer. Then in block 174, the bridge may respond locally to the frame and send the building controller value without first having to wirelessly request request the value from the remotely located building controller. If in decision block 170, the property is not found in the cache memory of the bridge, then in block 176, the bridge determines if there is an available slot in the frequently polled property buffer. If there is an open slot, then the new request may occupy the slot, as shown at block 178. If there is no available buffer slot in block 176, or if the frame is not a ReadProperty or a ReadPropertyMultiple frame in block 166, the bridge moves to block 180 and searches the Active Device List.

In decision block 182, the bridge may determine if the building controller or device needed to get the requested property is reachable (i.e. online). If the device is not reachable, then in block 198, the bridge may delete this property from the frequently polled property buffer, if it is present. Then, the frame may be abandoned.

If the device is reachable in block 182, then, in block 184, the bridge may determine if the local building controller or device needs a reply. If not, the bridge moves to block 188. If a reply is needed, then, in block 186, the bridge sends a Reply_Postponed response to the local building controller. In block 188, the bridge may place the ReadProperty or a ReadPropertyMultiple frame in the tunneling task to be translated and transmitted over the wireless network. In this case, when the requested data is not in the cache memory of the bridge, a translated request frame is transmitted over the wireless ZigBee network to the destination building controller.

Returning to block 128 of FIG. 6A, if the frame is a Data Not Expecting Reply frame message, the bridge may move to block 192, shown in FIG. 6B. In some cases, this frame may be used to convey data parameters and/or messages, and may not require a reply. In some cases, these may be referred to as unconfirmed frames or messages. In the illustrative embodiment, a Data Not Expecting Reply frame may include, for example, a "Who-Is" frame and an "I-Am" frame. The "Who-Is" frame may be used by a BACnet device to learn about another active device on the network. The "I-Am" frame, which may be in response to a "Who-Is" frame, may include information about the sending device.

In decision block 193, the bridge may determine if the frame is an "I-Am" frame. If the frame is an "I-Am" frame, the bridge may update the Active Device List with the device information, as shown at block 196. If the frame is not an "I-Am" frame, the bridge may move to decision block 194 and determines if the frame is a "Who-Is" frame. If the frame is a "Who-Is" frame, the bridge searches the Active Device List according to the "Who-Is" frame, in block 200. Then, in block 202, the bridge may reply to the "Who-Is" frame with an "I-Am" frame on behalf of the matching remote (wirelessly connected) active building controller(s) found in its Active Device List. In some cases, the bridge may move these reply frames into the BACnet transmit queue to send to the requesting building controller. In some cases, the "I-Am" messages may include information from the cache, when appropriate. If in block 194 the frame is not a "Who-Is" frame, the bridge may move to block 180 and search the Active Device List.

Figure 7:
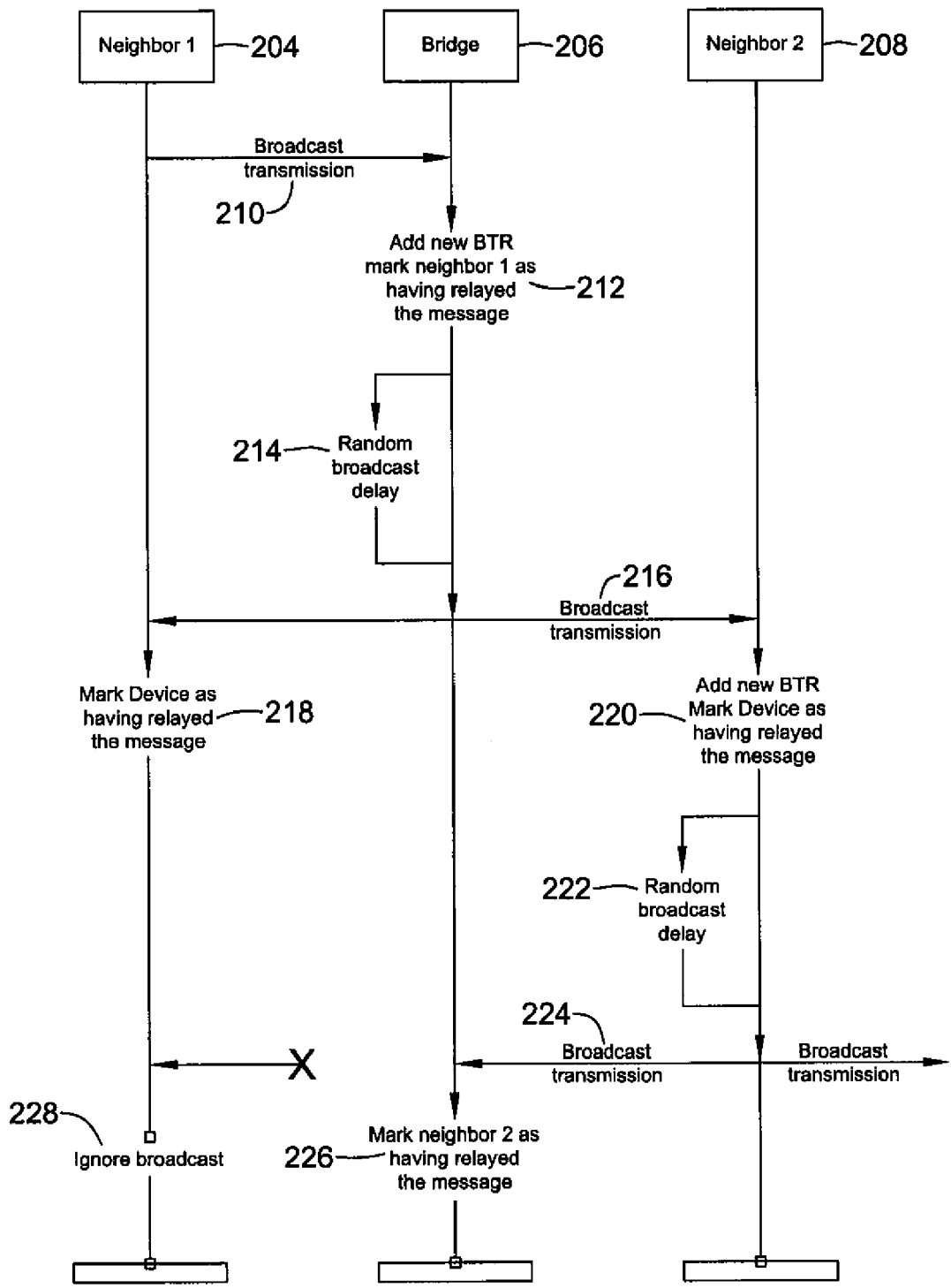
FIG. 7 is an illustrative procedure for a health message mechanism of the bridge.

FIG. 7 is an illustrative procedure for a health message mechanism of an illustrative bridge 206. In the illustrative embodiment, the health message may be generated by the tunneling algorithm of the bridge and broadcasted over the wireless network via the ZigBee task. In some cases, the health message may include information for the other building controllers on the network to help maintain the Active Device List.

In the illustrative procedure, the tunneling algorithm may maintain a relatively low periodicity timer for the health message mechanism. When the timer indicates, the tunneling algorithm may generate a health message and send it to the transmit queue of ZigBee task. The ZigBee task may then broadcast the health message, which may include device information, to other building controllers on the wireless network. In some cases, the health message may include broadcast parameters. For example, a destination address of the health message may be set to broadcast, the broadcast radius may be adjusted, a radius field of the frame may be set, and/or a random time period before retransmission for reducing broadcast jitter.

In the illustrative embodiment, the network may include a passive acknowledgement mechanism. The passive acknowledgement mechanism may allow the bridge 206 and its neighbors 204 and 208 to keeps track if its neighboring devices have successfully relayed the broadcast transmission. In some cases, the bridge 206 and or its neighbors 204 and 208 may keep a record of any new broadcast transaction that is either initiated locally and/or received from a neighboring device. In some cases, the record may be called a broadcast transaction record (BTR) and may contain the sequence number and the source address of the broadcast frame. The broadcast transaction records may be stored in a broadcast transaction table (BTT).

When a building controller 204, 206, and 208 receives a broadcast frame 210, 216, and 224 from a neighboring device 204, 206, and 208, the device may store the sequence number and the source address of the broadcast frame with the records in its BTT. If the device 204, 206, and 208 has a BTR of this particular broadcast frame in its BTT, it may update the BTR to mark the neighboring device as having relayed the broadcast frame 218 and 226. It may then drop the frame, if desired.

If no record of the device is found in the BTT, the receiving building controller may create a new BTR in its BTT and may mark the neighboring device as having relayed the broadcast 212 and 220. The network layer may also indicate to the higher layer that a new broadcast frame has been received. If the radius field value is greater than 0, the device may retransmit the frame. Otherwise, the device may drop the frame. Before the retransmission, the device may wait for a random time period or broadcast delay 214 and 222, if desired.

In some cases, and on receipt of a broadcast frame, the network layer may determine that the BTT is full and contains no expired entries. If this occurs, the frame may be ignored. In this situation, the frame may not be retransmitted, or it may be passed up to the next higher layer, if desired.

Figure 8:
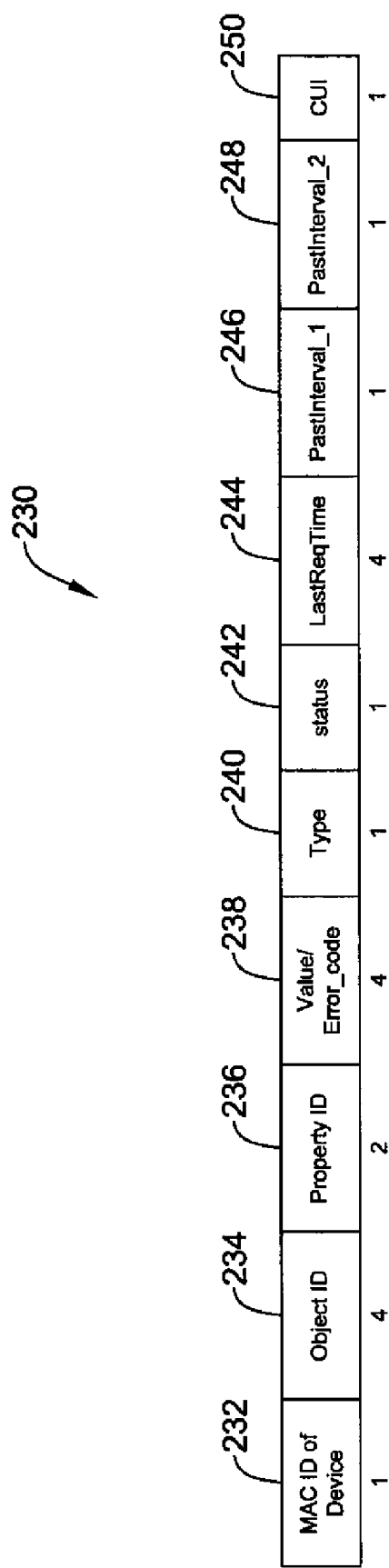
FIG. 8 is a block diagram of a slot of a frequently polled property buffer of an illustrative bridge.

FIG. 8 is a block diagram of a slot of a frequently polled property buffer 230 of an illustrative bridge. In some cases, the frequently polled property buffer 230 may be provided in a cache memory of the bridge, which may be included in the tunneling algorithm, if desired. In the illustrative embodiment, the frequently polled property buffer 230 includes ten fields, but it is contemplated that any suitable number of fields may be used, as desired.

In the illustrative embodiment, the frequently polled property buffer 230 may include a MAC ID of device field 232, an Object ID field 234, a Property ID field 236, a Value/Error_code field 238, a Type field 240, a Status field 242, a last requested time (LastReqTime) field 244, a past interval 1 (PastInterval_1) field 246, a past interval 2 (PastInterval_2) field 248, and a CUI field 250. In some cases, the MAC ID of Device field 232, the object ID field 234, the property ID field 236, the value/error_code field 238, and the type field 240 may be used to record the information or data of a property.

The frequently polled property buffer 230 may also include additional fields to store arrays or list and mechanism of array indexing.

In some cases, the LastReqTime field 244, the PastInterval_1 field 246, the PastInterval_2 field 248, and the CUI field 250 may be utilized by a learning algorithm to help calculate an interval at which the property is to be requested from a remotely located building controller. The LastReqtime field 244 may record the system time at which the property was last polled. The PastInterval_1 field 246 may record the last interval between requests. The PastInterval_2 field 248 may record the interval between requests the time before the last time. The CUI field 250 may record the interval that the source bridge updates the property maintained by the source bridge (e.g. a temperature property may be updated ever 1 minute, while a humidity property may be updated every 5 minutes).

In some cases, the status field 242 may be used to represent the status of the frequently polled property buffer memory slots. For example, the status field 242 may store "active" or "inactive". "Active" may indicate that the building controller represented by the slot is in an active state. "Inactive" may indicate that the building controller represented by the slot is in an inactive state. In some cases, when a slot is initially added, the status field 242 may be set to "inactive". When a periodic update message from the indicated building controller is received, the status may switch to "active". In some cases, the status field 242 may be set to "free", which may indicate that the slot is empty and can be occupied by new building controller, if desired. Additionally, in some cases, the status field 242 may be set to "reserved", which may indicate that the slot is reserved for a particular building controller. It should be recognized that the forgoing property fields are merely illustrative. It is contemplated that any suitable field and/or values may be used in the frequently polled property buffer 230, as desired.

Figure 9:
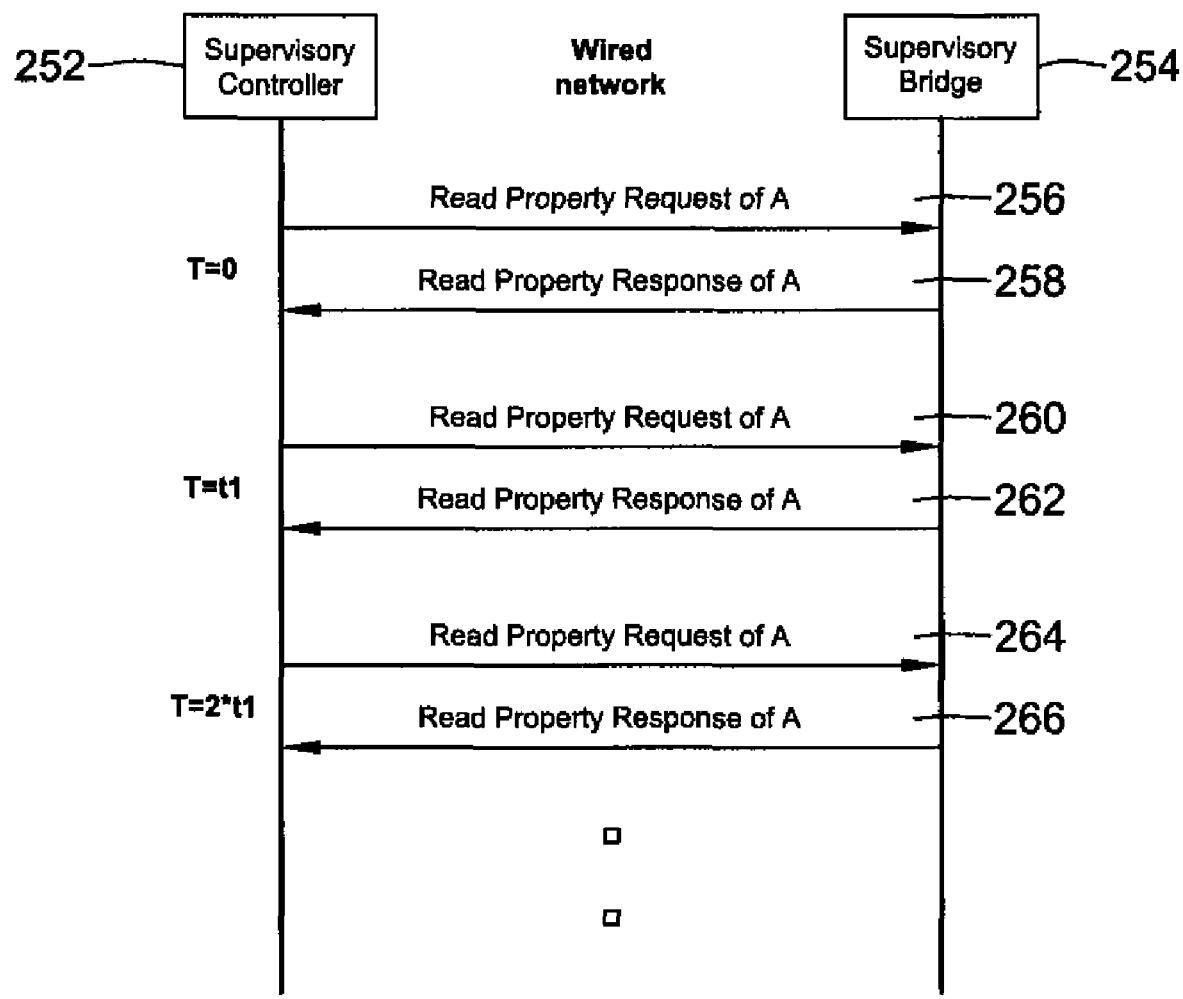
FIG. 9 is a schematic diagram of illustrative communication procedure between a supervisory controller and a supervisory bridge.

FIG. 9 is a schematic diagram of illustrative communication procedure between a supervisory controller 252 and a unitary controller (shown as supervisory bridge 254), over a wired BACnet network or line. The supervisory bridge 254 may operate to help ensure that the supervisory controller 252 may not find differences while communication with remote wireless devices. The supervisory bridge 254 may correspond to the supervisory bridge 16 of FIG. 1, and the supervisory controller 252 may correspond to the supervisory controller 12 of FIG. 1. The supervisory bridge 255 may wirelessly communicate with a number of remotely located source bridges, and each of the remotely located source bridges may be part of, or in wired communicate with, one or more building controllers and/or other devices (similar to that shown in FIG. 1).

In the illustrative communication procedure, the supervisory controller 252 may be configured to send a ReadProperty Request message 256, 260, and 264 to the supervisory bridge 254 at time intervals of "t". For example, the supervisory controller 252 may send a ReadProperty Request message 256 at time (T) T=0, a ReadProperty Request message 260 at time T=t, and a ReadProperty Request message 264 at time T=2t.

In response to the ReadProperty Request messages 256, 260, and 264, the supervisory bridge 254 may send ReadProperty Response messages 258, 262, and 266 to the supervisory controller 252. In some cases, the ReadProperty Response messages 258, 262, and 266 may be sent within a time from the ReadProperty Request message 256, 260, and 264 to satisfy any timing requirements of the supervisory controller 252.

The ReadProperty Request messages 256, 260, and 264 may be requesting data and/or information from one or more of the remotely located building controllers. As noted above, the supervisory bridge 254 may have already requested the information from the one or more of the remotely located building controllers and stored the data and/or information in its frequently polled property buffer of its cache memory. This may allow the supervisory bridge 254 to send ReadProperty Response messages 258, 262, and 266 back to the supervisory controller 252 without first having to wirelessly transmit a request message to one or more of the remotely located building controllers, allowing timing requirements of the supervisory controller 252 to be met.

Figure 10:
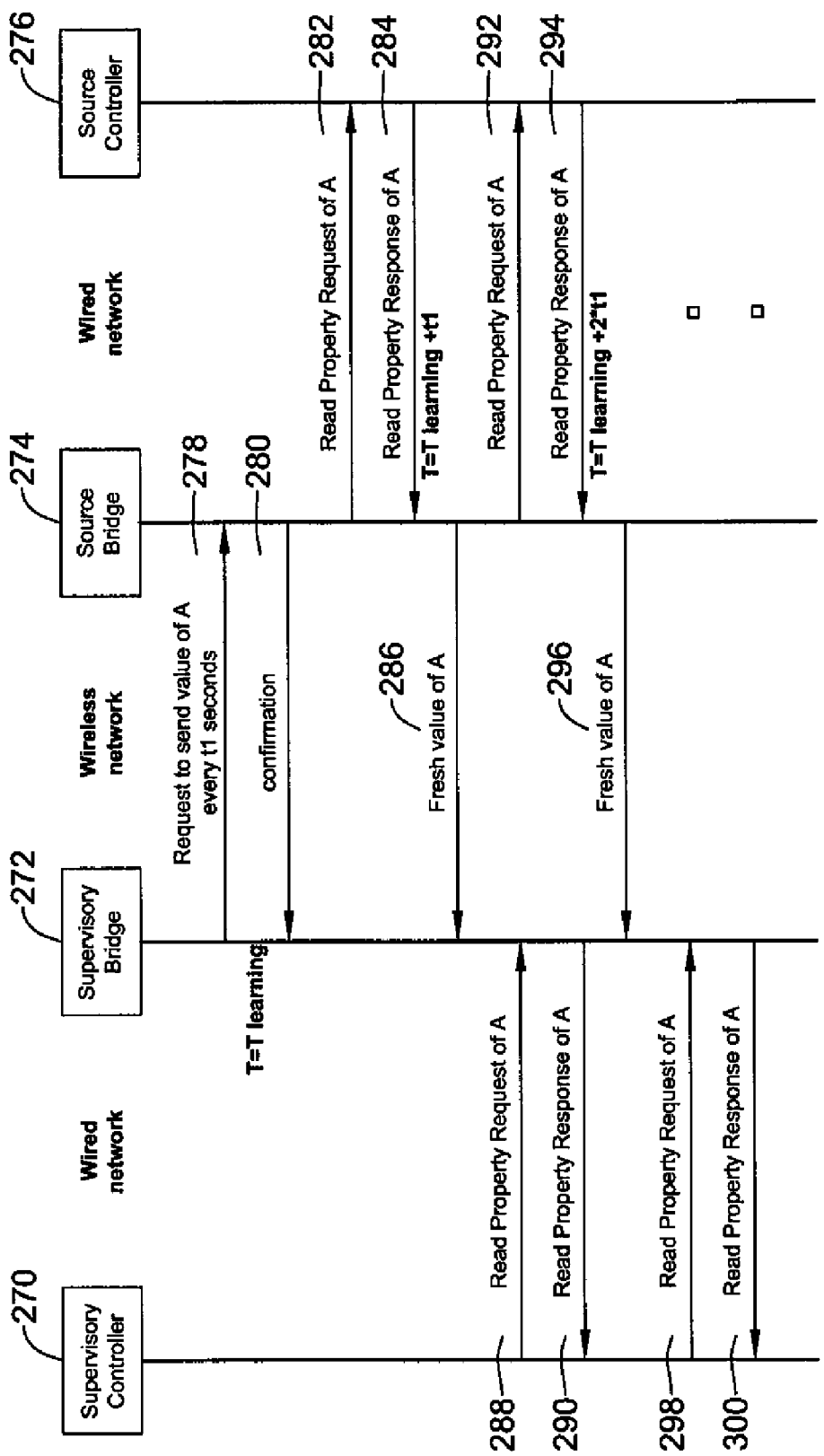
FIG. 10 is a schematic diagram of an illustrative communication procedure a supervisory controller and bridge and a source controller and bridge.

FIG. 10 is a schematic diagram of an illustrative communication procedure for communicating between a supervisory controller 270, supervisory bridge 272, source bridge 274, and a source building controller 276. In the illustrative embodiment, the source bridge 274 may include a periodic update mechanism to, for example, help reduce traffic over the wireless network between the supervisory bridge 272 and the source bridge 274. As shown in FIG. 10, the supervisory bridge 272 may simply tunnel the read property requests to the source controller 276 until the supervisory bridge 272 learns the periodicity of these requests. After the learning mechanism of the supervisory bridge 272 learns the periodicity of the request, the supervisory bridge 272 may be configured to send the source bridge 274 a subscription request packed 278 requesting the source bridge 274 to periodically monitor and report data from the source controller 276. For example, the supervisory bridge 272 may send a subscription request message 278 including periodic update data to the source bridge 274 at time $T=T_{learning}$. In this example, the subscription request 278 may request that the source bridge 274 send a value of property A at intervals of "t1" seconds. In response to this request, the source bridge 274 may reply with a confirmation 280 to acknowledge receipt, and internally configure a timer to periodically poll the property from the source controller 276 every t1 seconds and to transmit the property value to the supervisory bridge 272 so that the supervisory bridge 272 receives the fresh property value before the next request from the supervisory controller 270.

Subsequent to the time that the source bridge 274 received the subscription request data 278, the source bridge 274 may send a ReadProperty Request of property A 282, where A is a property value, to the source building controller 276. The source building controller 276 may respond to the ReadProperty Request of property A 282 with a ReadProperty Response of property A 284 including the requested data. Then, at time $T_{learning}+t1$, the source bridge 274 may send a fresh value of property A message 286 to the supervisory bridge 272. In some cases, the supervisory bridge 272 may store the fresh value of A in a frequently polled property buffer of its cache memory.

Then, after time $T_{learning}+t1$, the supervisory controller 270 may send the supervisory bridge 272 a ReadProperty Request of A 288. The supervisory bridge 272 may respond to the supervisory controller 270 with a ReadProperty Response of A 290 message including the fresh value of A, without having to first wirelessly transmit a request to the remotely located source building controller 276 via the source bridge 274.

The source bridge 274 may send another ReadProperty Request of property A 292 to the source building controller 276. The source building controller 276 may respond to the ReadProperty Request of property A message 292 with a ReadProperty Response of property A 294 message including the requested data. Then, at time $T_{learning}+2*t1$, the source bridge 274 may send a fresh value of the property A message 296 to the supervisory bridge 272. In some cases, the supervisory bridge 272 may update the frequently polled property buffer in the cache memory of the supervisory bridge 272 with the fresh value of property A.

After time $T_{learning}+2*t1$, the supervisory controller 270 may send the supervisory bridge 272 a ReadProperty Request of property A 298. The supervisory bridge 272 may respond to the supervisory controller 270 with a ReadProperty Response of A 300 message including the fresh value of property A. This procedure may be repeated to continually obtain fresh values or property A at the supervisory controller 270, without having to wait for wireless transmissions from the source building controller or device 276.

Figure 11:
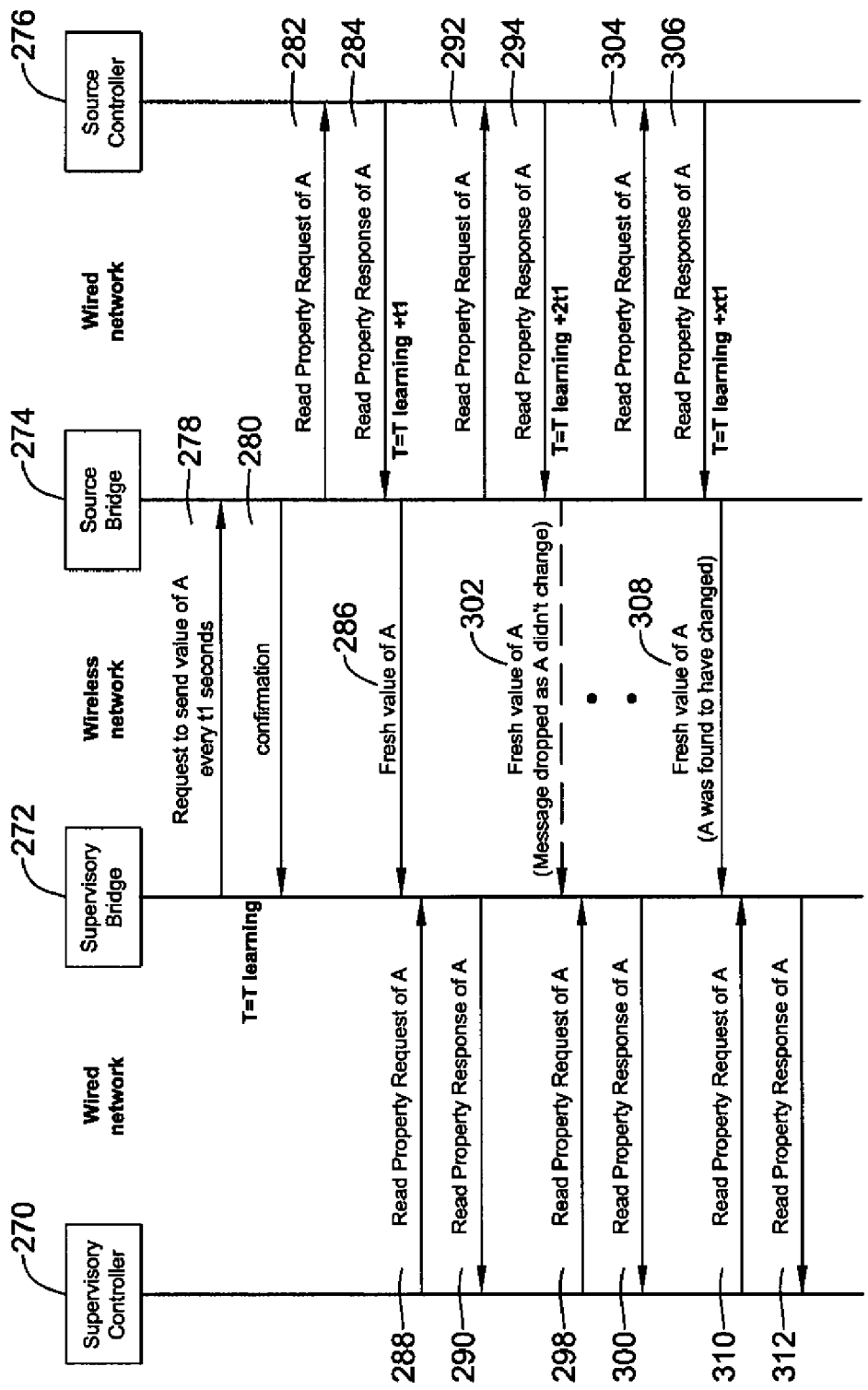
FIG. 11 is a schematic diagram of an illustrative communication procedure of FIG. 10 including a virtual COV mechanism.

FIG. 11 is a schematic diagram of an illustrative communication procedure of FIG. 10 including a virtual COV mechanism. In the illustrative embodiment, the source bridge 274 may include a virtual COV mechanism. The virtual COV mechanism may configure the source bridge 274 to compare the current value of property A to a previous value of property A. If the value of property A has not changed, or in some cases, if the value of property A has changed by an amount that is less than a threshold amount, the value of property A may not be transmitted to the supervisory bridge 272.

For example, and referring to the example of FIG. 11, at time $T_{learning}+2*t1$, the source bridge 272 may determine that the value of property A has not changed or has not changed by a threshold amount, and the fresh value of property A message 302 may be dropped and not transmitted back to the supervisory bridge 272. In this case, for the response to a ReadProperty Request of property A message 298, the supervisory bridge 272 may send the ReadProperty Response of property A message 300 including the value of A stored in the frequently polled property buffer of its cache memory.

If, in response to a ReadProperty Request of property A message 310, and at time $T_{learning}+3*t1$, the source bridge 272 may determine that the value of property A has indeed changed by more than a threshold amount, and the fresh value of A message 308 may be transmitted back to the supervisory bridge 272. In this case, for the response to the ReadProperty Request of property A message 310, the supervisory bridge 272 receive the fresh value of property A, and may send the ReadProperty Response of property A message 312 including the fresh value of A from message 308 to the supervisory controller 270.

In some embodiments, if the supervisory bridge 272, controller 270, the source bridge 274, or controller 276 go offline or power is lost, the COV mechanism may need to be updated. In some cases, the supervisory bridge 272 may automatically perform this update when the supervisory bridge 272 is back online.

In some embodiments, the source bridge 274 may be connected to multiple source controllers. In this case, the source bridge 274 may be configured to operate with each of the multiple source controllers according to the description provided with reference to source controller 276. For example, the source bridge 274 may implement virtual COV for all of the source controllers connected thereto. The source bridge 274 may periodically poll the one or more subscribed properties from the corresponding source controllers and send an update over the wireless network when a property is found to have changed by more than a threshold.

Figure 12:
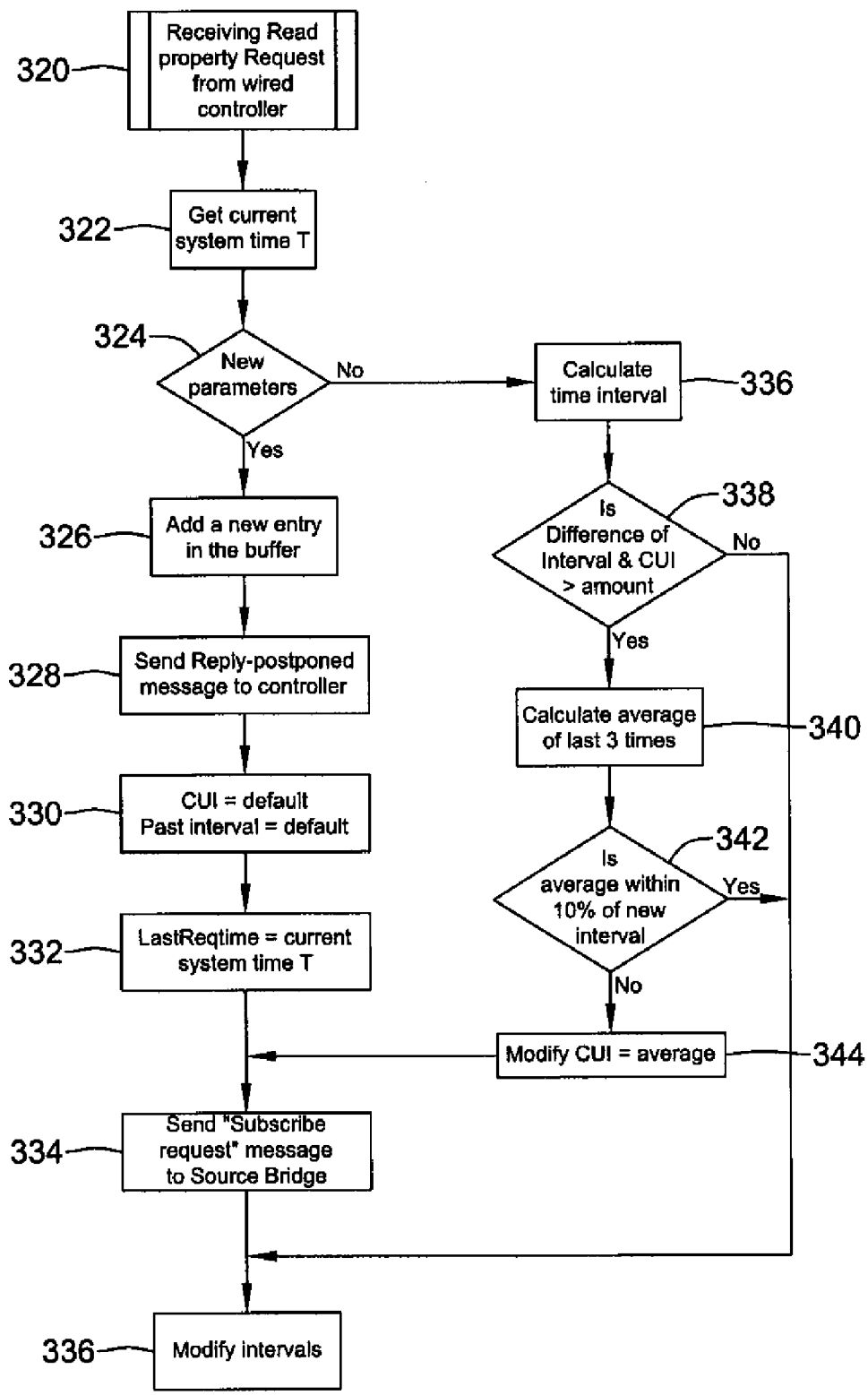
FIG. 12 is a flow diagram of an illustrative learning algorithm of an illustrative bridge.

FIG. 12 is a flow diagram of an illustrative learning algorithm of an illustrative bridge. In the illustrative embodiment, the learning algorithm may determine the current interval of messages received from the supervisory controller. In the illustrative embodiment, the learning algorithm may use four fields of the frequently polled property buffer (shown in FIG. 8), such as, for example, the LastReqtime field 244, the PastInterval_1 field 246, the PastInterval_2 field 248, and the CUI (Current Update Interval) field 250.

In the illustrative method, and at block 320, the supervisory bridge may receive a read property request from the wired supervisory controller. In block 322, the supervisory bridge may retrieve the current system time. In decision block 324, the supervisory bridge may determine if there are any new parameters requested. If there are no new parameters requested, then in block 326, the supervisory bridge may calculate the current time interval. In the illustrative embodiment, the current time interval may be the current time minus the last request time, stored in the LastReqtime of the frequently polled property buffer. Next, in decision block 338, the supervisory bridge may determine if the current time interval is different from the CUI by more than an amount. As indicated above, the CUI field may record the interval that the source bridge updates the property maintained by the source bridge (e.g. a temperature property may be updated ever 1 minute, while a humidity property may be updated every 5 minutes). In some cases, decision block 338 may determine if the current time interval is more than the CUI by a predetermined amount such as 5 percent, 10 percent, 15, percent, 20 percent, or any other suitable amount, as desired.

If the difference between the current time interval and the CUI is not greater than the threshold amount, the supervisory bridge may ignore the difference and move to the end. If the difference between the current time interval and the CUI is greater than the threshold amount, the supervisory bridge may calculate the average of the last three times intervals, as shown at block 340. It should be understood that the number of previous time intervals used in block 340 is merely illustrative, and that any suitable number of intervals may be used, as desired.

After calculating the average of the last three intervals, the supervisory bridge may determine if the calculated average is within a predetermined difference of the new interval, as shown by decision block 342. For example, decision block 342 may determine if the calculated average deviates from the new interval by 5 percent, 10 percent, 15, percent, 20 percent, or any other suitable difference, as desired. If the calculated average is within the predetermined difference of the new interval, then the difference may be ignored. If the difference is not within the predetermined difference, then, at block 344, the supervisory bridge may modify the CUI to equal the new average. Then, in block 334, the supervisory bridge may send a subscribe request message to the appropriate source bridge to request a new parameter at a determined update interval or a changed update interval for an already subscribed parameter.

If in decision block 324, the read property request is a new parameter, the supervisory bridge may add a new entry in the frequently polled property buffer, as shown at block 326. Then, in block 328, the supervisory bridge may send a Reply Postponed message to the supervisory controller. The Reply Postponed message may give the supervisory bridge time to transmit the request to the appropriate source bridge and receive a response. In block 330, the supervisory bridge may set CUI for that new property to a default value, and the past interval equal to a default setting. Then, in block 332, the supervisory bridge may set the LastReqtime equal to the current time. The supervisory bridge may then move to block 334 and send the subscribe request to the appropriate source bridge. After block 334, the intervals may be modified, as shown at block 336.

Figure 13:
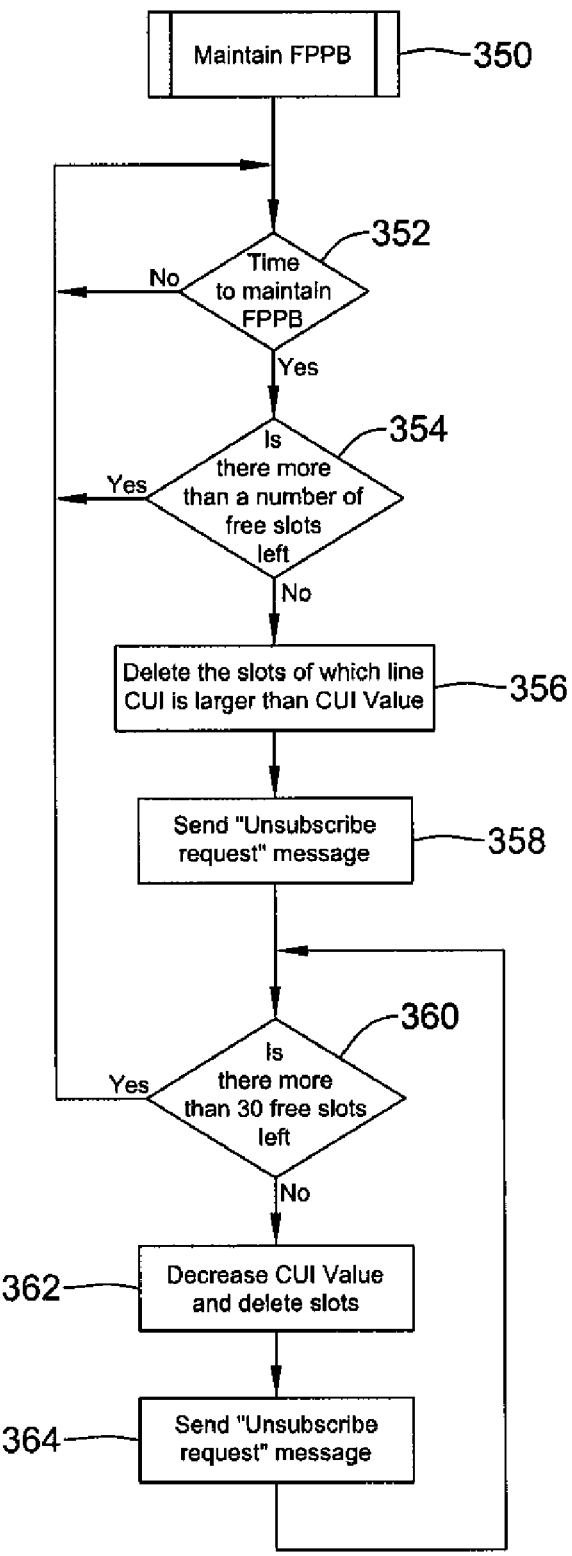
FIG. 13 is a flow diagram of an illustrative method of performing maintenance on the frequently polled property buffer.

FIG. 13 is a flow diagram of an illustrative method for performing maintenance on the frequently polled property buffer. In some cases, the tunneling mechanism may cache the most frequently polled properties in the frequently polled property buffer, and delete slots in the frequently polled property buffer which are not polled frequently when the frequently polled property buffer begins to fill up. In some cases, criteria that may be used by the supervisory bridge to delete slots in the frequently polled property buffer may be based on the "LastReqTime" field and/or the CUI field. As discussed previously, the "LastReqTime" field stores the system time when this property was last polled, and the CUI stores the update time interval of the particular property in the source bridge. In some cases, the slots which have the largest difference between the value of "LastReqTime" and current system time, the longest CUI, and/or other criteria may be used to determine which slots are deleted when necessary.

In the illustrative method, the bridge may enter a maintain frequently polled property function at block 350. In decision block 352, the bridge may determine if it is time to maintain the frequently polled property buffer. If it is not time to maintain the frequently polled property buffer, the method returns to the start and, in some cases, may repeat at an interval.

If the bridge determines that it is time to maintain the frequently polled property buffer at decision block 325, then in decision block 354, the bridge may determine if there are more than a threshold number of free slots in the frequently polled property buffer. In some cases, the threshold number may be 5, 10, 15, 20, 30, 40, 50, or any other number of free slots, as desired. If there is more than the threshold number of free slots, the supervisory bridge may return to the start. If there are not more than a threshold number of free slots, then, in block 356, the bridge may delete the slots having a CUI value larger than a predetermined CUI value, or use some other criteria to delete certain slots. In some cases, the predetermined CUI value may be a value of 5 minutes, 10 minutes, 30 minutes, or any other suitable time period, as desired.

In block 358, the bridge may send a "unsubscribe request" message to the source bridges for the property that corresponds to the slots that were deleted. After block 358, the bridge may determine again if there is more than the predetermined number of free slots. If there is, then the supervisory bridge returns to the start. If there is not, then the supervisory bridge may decrease the predetermined CUI value by an amount, such as by 0.1 minutes, 0.2 minutes, 0.5 minutes, 1 minute, or any other amount, as desired. Then, still in block 362, the supervisory bridge may delete any of the slots having a CUI value that is greater than the decreased CUI value. Then, in block 364, similar to block 358, the bridge may send a "unsubscribe request" message to the source bridges for the property that corresponds to the slots that were deleted. Then, the bridge may return to decision block 360 and repeat until there is more than the predetermined number of slots available in the frequently polled property buffer.

Figure 14:
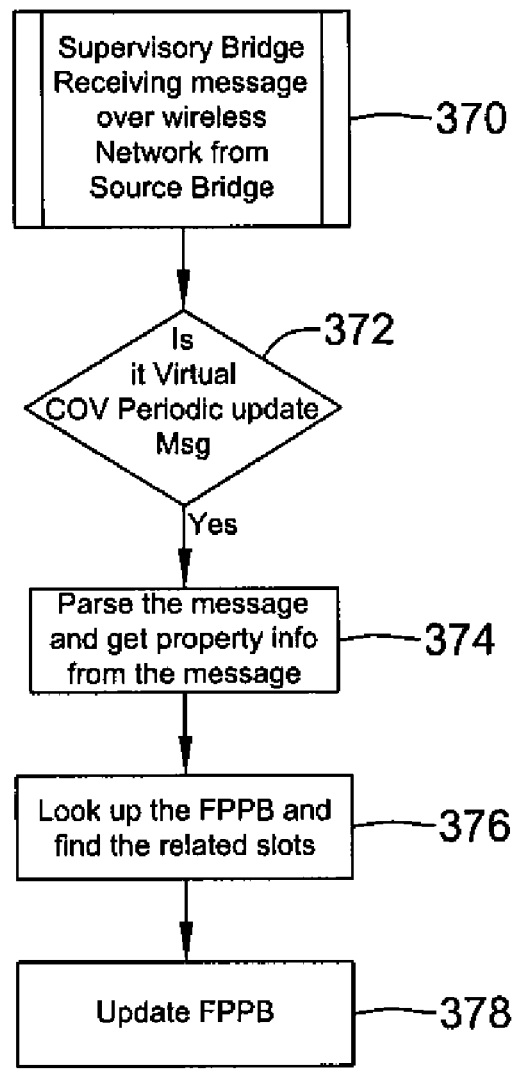
FIG. 14 is a flow diagram of an illustrative method of receiving virtual COV messages by the supervisory bridge.

FIG. 14 is a flow diagram of an illustrative method of receiving virtual COV messages by a supervisory bridge. In some embodiments, a source bridge may send periodic messages to the supervisory bridge over the wireless network to update the frequently polled property buffer. The periodic update messages may update one or more values for a property stored in the frequently polled property buffer.

In the illustrative method, the supervisory bridge may receive a message from a source bridge, as shown at block 370. Then, in decision block 372, the supervisory bridge may determine if the message is a virtual COV periodic update message. If the message is a virtual COV periodic update, then the method may continue, otherwise the method may end.

If the message is a virtual COV periodic update message, then at block 374, the supervisory bridge may parse the message and get the property information from the message. In block 376, the supervisory bridge may then look up the frequently polled property buffer and find the slot that corresponds to the message received. Then, at block 378, the supervisory bridge may update the frequently polled property buffer with the new values. As can be seen, the source bridge may be configured to automatically update the frequently polled property buffer of the supervisory bridge.

Figure 15:
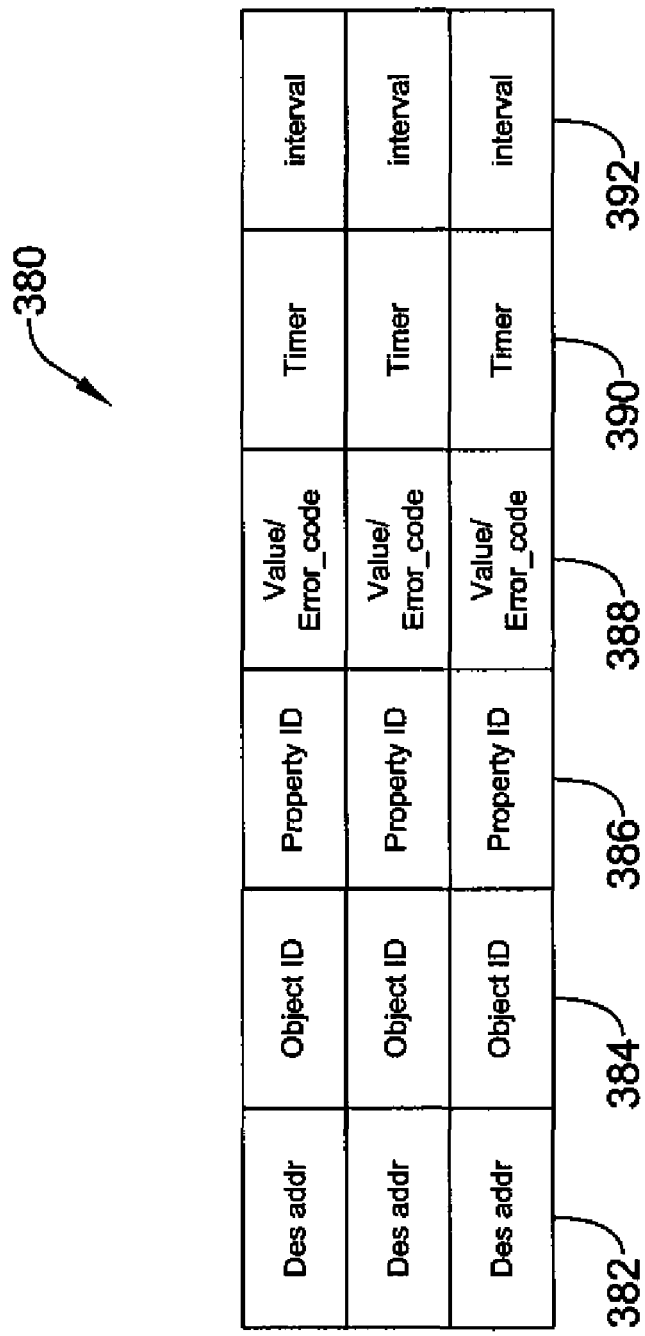
FIG. 15 is a block diagram of an illustrative subscription list for a source bridge.

FIG. 15 is a block diagram of an illustrative subscription 380 list for a source bridge. In the illustrative embodiment, the source bridge includes a memory to store a list of properties subscribed for the virtual COV mechanism. In operation, the source bridge may store a property in the subscription list 380 when the source bridge receives a request message from the supervisory bridge over the wireless network. The subscription list 380 may help the source bridge identify and send the supervisory bridge a requested property value at a desired interval to help the supervisory bridge maintain an updated frequently polled property buffer in cache memory.

In the illustrative embodiment, the subscription list 380 may include a number of properties, each having a number of fields. The illustrative subscription list shown in FIG. 15 includes three properties, each having six fields. This is merely illustrative and it is contemplated that any suitable number of properties and/or fields may be used, as desired.

In the illustrative embodiment, the fields include a "Des Addr" field 382, a "Object ID" field 384, a "Property ID" field 386, a "Value/Error_code" field 388, a "Timer" field 390, and an "Interval" field 392. The "Des Addr" field 382 may record the address of the supervisory bridge to which the property should be sent. The "Object ID" and "property ID" fields 384 and 385 may record which property is polled by the supervisory controller. The "Value/Error_code" field 388 may record the value that was sent to Supervisory Bridge last time. In some cases, the source bridge may send a read property request to the source building controller or device to update the property value when the "timer" field 390 indicates. In some cases, the source bridge may compare the stored value to the new value and, if the value has not changed by a threshold amount, a refresh message may not be sent to the supervisory bridge.

The "timer" and "interval" fields 390 and 392 may be used to trigger periodic request of a fresh property for the source controller. The initial value of the "timer" field 390 may be filled with the value of "interval" 392. The source bridge may maintain this information to count down the "timer" field 390. When the "timer" field 390 is counted to zero, the source bridge may send a "read property request" message to source building controller or device, and reload the "timer" field 390 with the value of "interval" field 392. The "interval" field 392 may record the interval at which the corresponding property should be refreshed. If the property value is changed by a threshold amount, a refresh message may be sent to the supervisory bridge.

Figure 16:
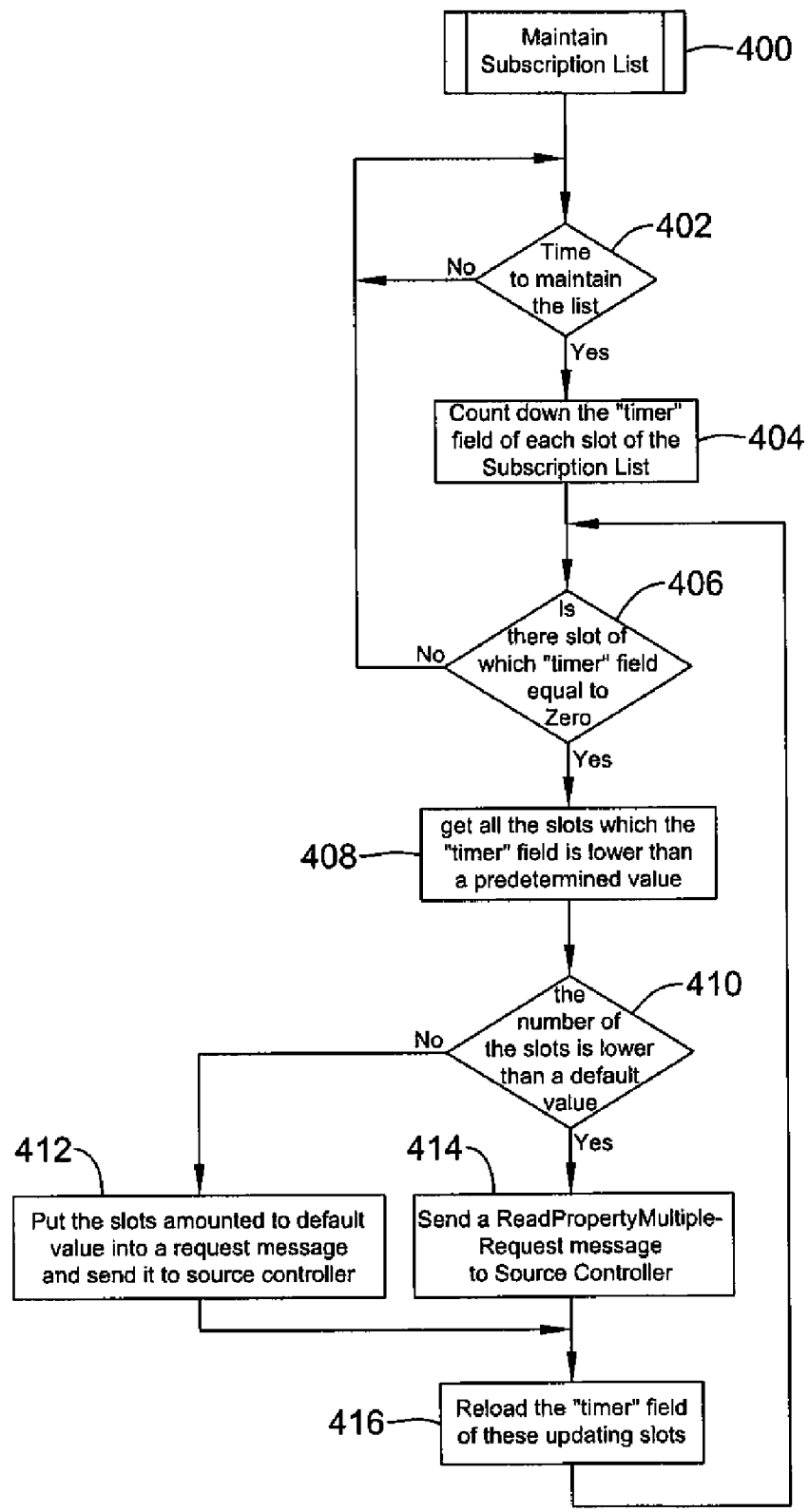
FIG. 16 is a flow diagram of an illustrative method of maintaining the subscription list of an illustrative source bridge.

FIG. 16 is a flow diagram of an illustrative method for maintaining the subscription list of an illustrative source bridge. In the illustrative method, the source bridge may enter a maintain subscription list task as shown at block 400. Then, the source bridge may determine if it is time to maintain the list, as shown at decision block 402. If it is not time, the method may loop back to the beginning. If it is time to maintain the list, then at block 404, the source bridge may count down the timer field of each property slot in the subscription list. Then, in decision block 406, the source bridge may determine if there is a property slot having a timer field equal to zero. If no timer field equals zero, then the method returns to the start. If there is a property slot having a timer field equal to zero, then, at block 408, the source bridge may identify all the property slots which the timer filed is lower than a predetermined threshold value. In some cases, the predetermined threshold value may be 1 second, 5 seconds, 10 seconds, or any other time, as desired.

Then, in decision block 410, the source bridge may determine if the number of identified property slots is lower than a default value. If the number of identified property slots is not lower than the default value, then, at block 412, the source bridge may put the identified property slots into a request message and send it to the source building controller. If the number of identified property slots is less then the default value at block 410, then in block 414, the source bridge may send a ReadPropertyMultiple-Request message to the source building controller. In either case, the source bridge may go back to block 416 and reload the timer field of the updating property slots. Then, the method may return to block 406 and repeat until there are no slots having a timer field equal to zero.

Figure 17:
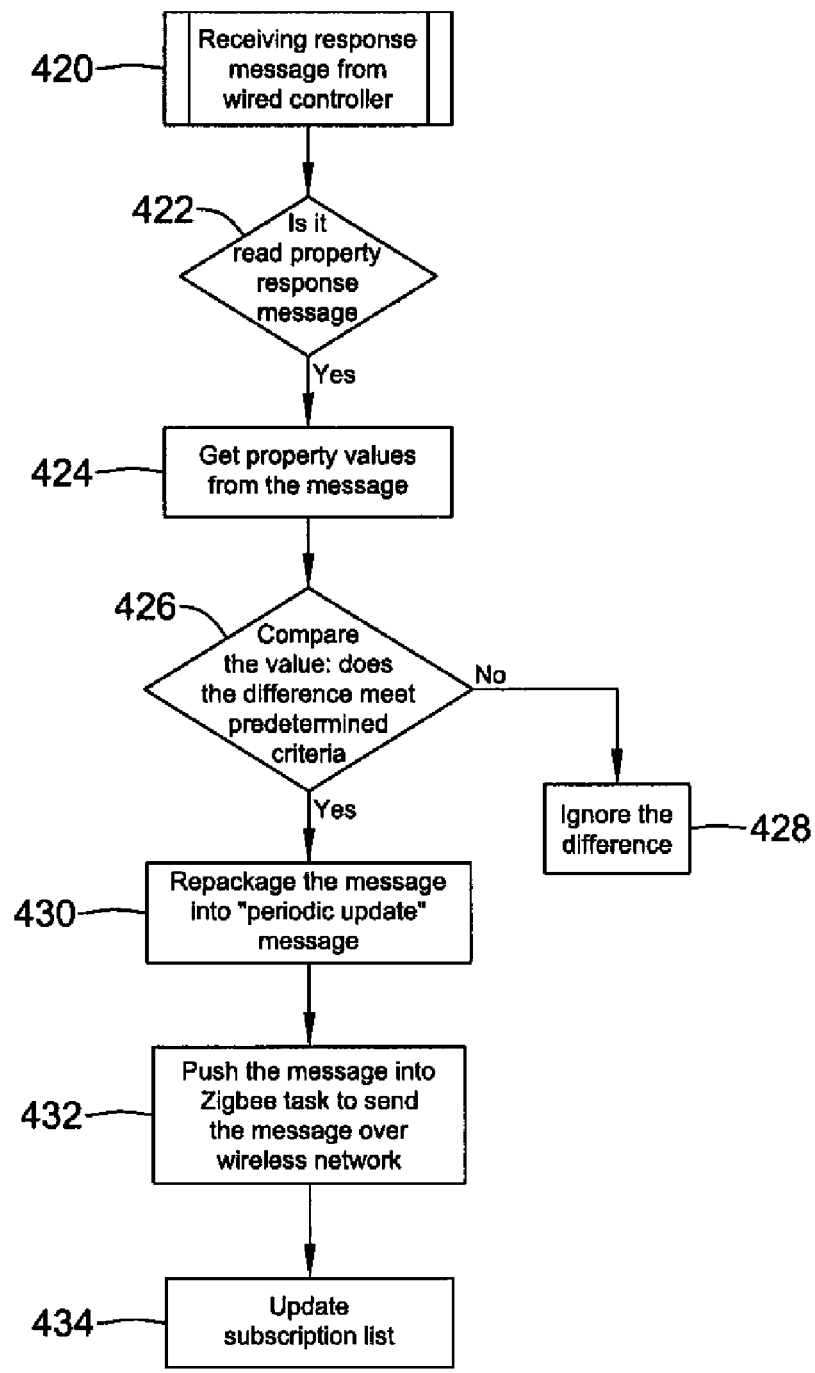
FIG. 17 is flow diagram of an illustrative method of a source bridge receiving a response message from a source controller.

FIG. 17 is flow diagram of an illustrative method of a source bridge receiving a response message from a source building controller. In the illustrative method, and at block 420, the source bridge may receive a response message from a wired source building controller. Then, in decision block 422, the source bridge may determine if the message is a read property response message. If the message is not a read property response message, the method is ended. If the message is a read property response message, then at block 424, the source bridge may get the property value from the message.

Next, in decision block 426, the source bridge may compare the current value to a value stored in the subscription list. If the difference does not meet predetermined criteria, the difference is ignored. In some cases, the predetermined criteria may be a change in value by a predetermined or threshold amount. However, any suitable criteria may be used, as desired. In this case, the updated value may not be sent to the supervisory bridge because the difference did not exceed a threshold value. If the difference between the current value and the value stored in the subscription list does meet predetermined criteria, then the message is repackaged into a "periodic update" message, as shown at block 430. Then, in block 432, the source bridge may push the message into the ZigBee or other wireless task to be sent over the wireless network. Then, in block 434, the source bridge may update the subscription list.

Figure 18:
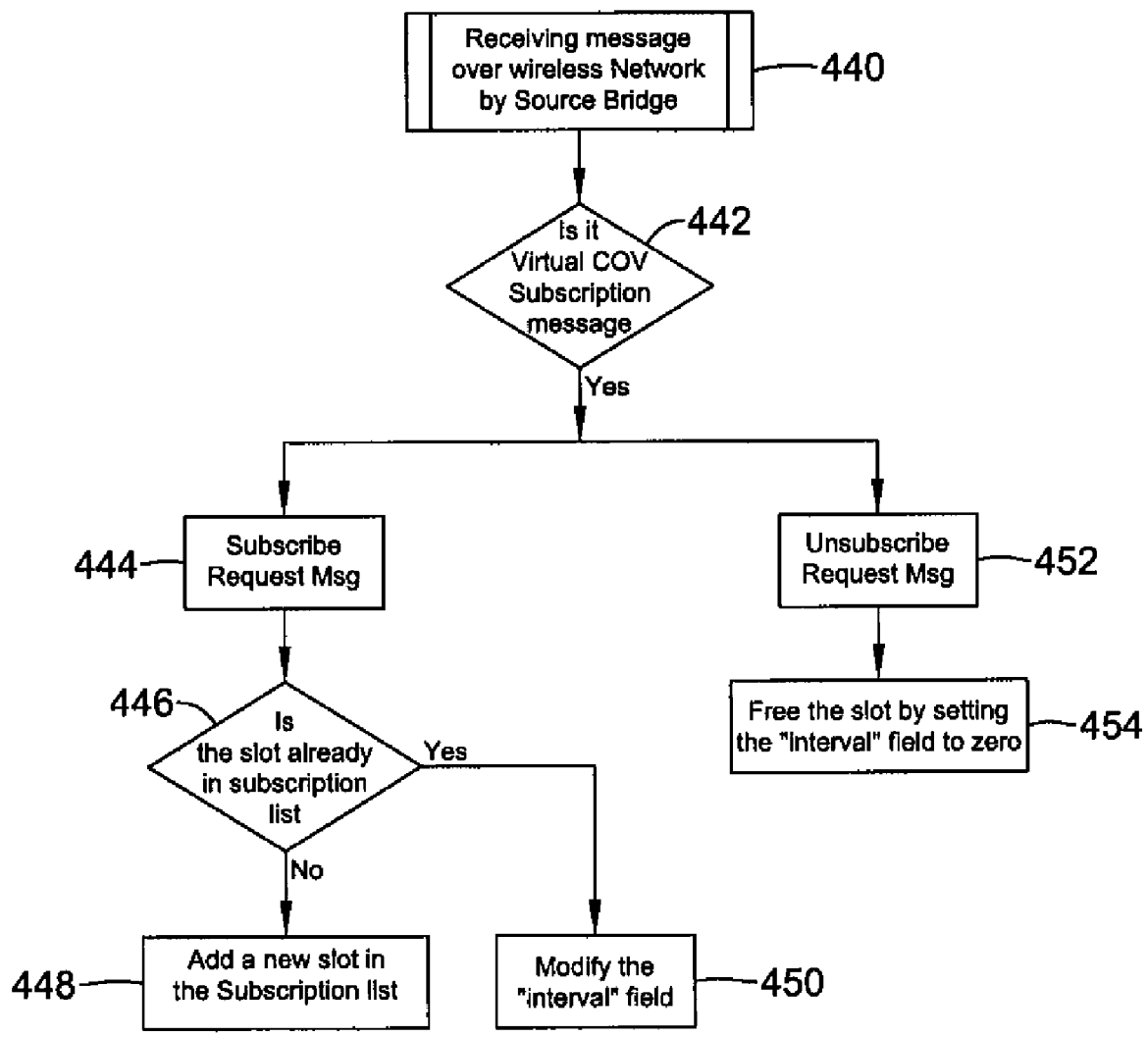
FIG. 18 is an illustrative flow diagram of a source bridge receiving a message over the wireless network.

FIG. 18 is an illustrative flow diagram of a source bridge receiving a message over the wireless network. In block 440, the source bridge may receive a message over the wireless network from a supervisory or other bridge. Then in decision block 442, the source bridge may determine if the message is a virtual COV subscription message. If yes, the source bridge may also determine what type of virtual COV subscription message is received. If the message is a subscribe request message in block 444, and in block 446, the source bridge may determine if the property slot is already in the subscription list. If the property slot is already in the subscription list, the source bridge may modify the interval field, in block 450 if desired. If the slot is not already in the subscription list, then the source bridge may add a new property slot in the subscription list and update the fields accordingly, as shown at block 448.

If the message is an unsubscribe request message, as shown at block 452, then, in block 454, the source bridge may free the property slot by setting the interval field to zero. In other words, the source bridge may unsubscribe the property slot. In some cases, the property slot may be deleted from the subscription list, but this is not required.

Figure 19:
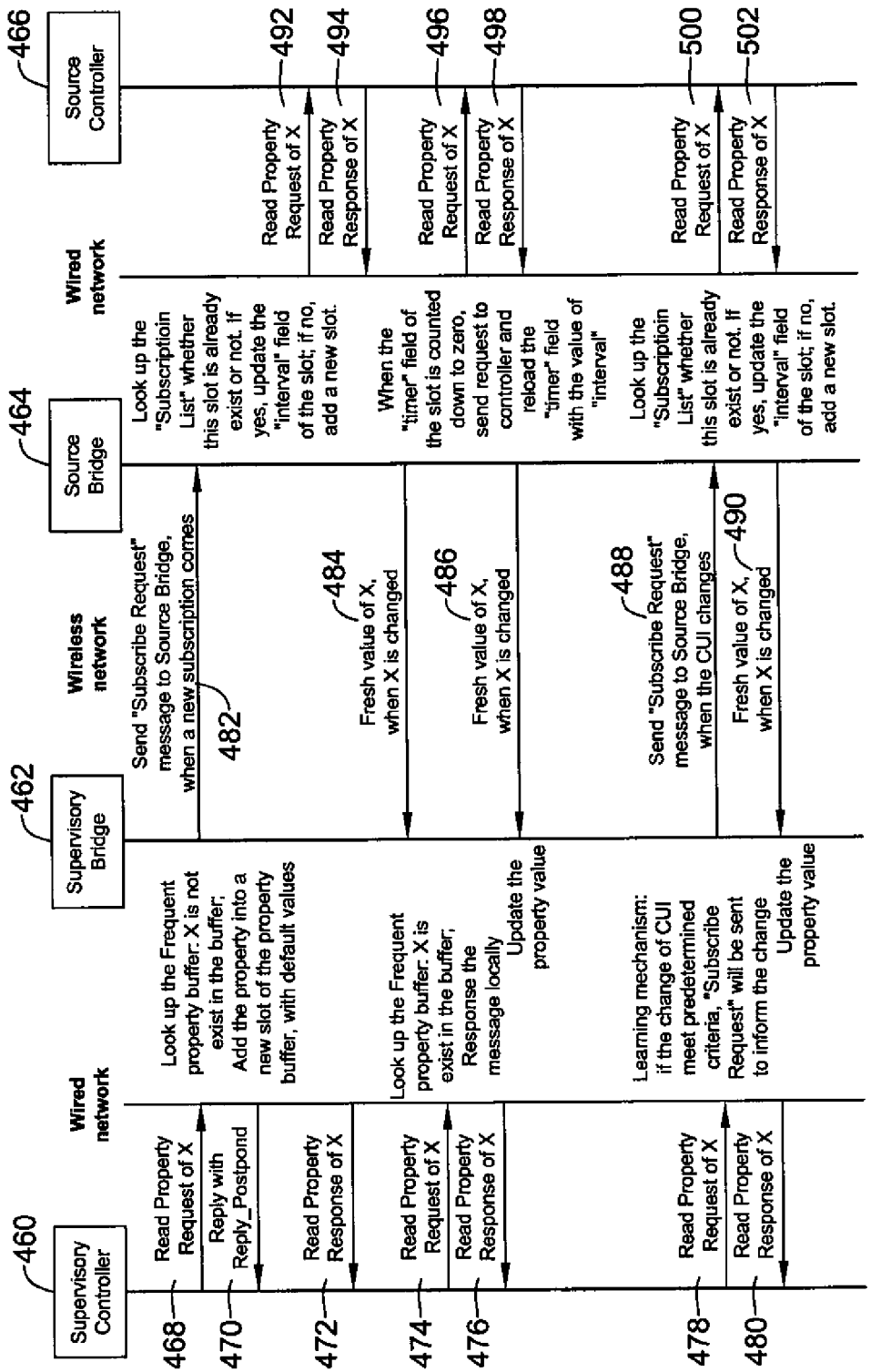
FIG. 19 is an illustrative procedure of the virtual COV mechanism.

FIG. 19 is an illustrative procedure of the virtual COV mechanism. In the illustrative embodiment, a supervisory controller 460 may send a ReadProperty Request of property "X" message 468 to a supervisory bridge 462. The supervisory bridge 460 may look in the frequently polled property buffer for property X, and if property X does not exist, the property may be added into a new slot of the frequently polled property buffer with default values. The supervisory bridge 462 may respond to the supervisory controller with a Reply Postponed message 470. The supervisory bridge 462 may also send a subscribe request message 482 to an appropriate source bridge 464 across the wireless network when there is a new subscription. When the supervisory bridge 462 receives a value for property X, the supervisory bridge may send the supervisory controller 460 a ReadProperty Response of property X message 472.

After an interval of time, the supervisory controller 460 may send another ReadProperty Request of X message 474 to the supervisory bridge 462. The supervisory bridge may look up the property in the frequently polled property buffer, and if the value of property X is found, the supervisory bridge 462 may respond to the supervisory controller 460 with a ReadProperty Response of property X message 476 including the value of property X.

After another interval of time, the supervisory controller 460 may send another ReadProperty Request of X message 478 to the supervisory bridge 462. The supervisory bridge may look up the property in the frequently polled property buffer, and if the value of property X is found, the supervisory bridge 462 may respond to the supervisory controller 460 with a ReadProperty Response of property X message 480 including the value of property X. Also, if the supervisory bridge 460 determined by using the learning mechanism that the change of CUI meets a predetermined criteria, a Subscribe Request 488 may be send to the source bridge 464 to update the CUI in the subscription list of the source bridge 464.

When the source bridge 464 receives a Subscribe Request, such as Subscribe Request 482, from the supervisory bridge 462, the source bridge 464 may look in its subscription list and determine whether the requested property already exists in its subscription list. If it does, the interval field may be updated and if it does not, a new property slot may be added. Also, when the source bridge 464 receives Subscribe Request 488, the source bridge 464 may look in its subscription list and determine whether the requested property already exists in its subscription list. If it does, the interval field may be updated and if it does not, a new property slot may be added.

Once the source bridge 464 subscribes to a property, the source bridge 464 may send a ReadProperty Request of property X message 492 according to an interval stored in the subscription list. In response to the message 492, a source building controller 466 may send to the source bridge 464 a ReadProperty Response of property X message 494 including the current value of property X. When the source bridge determined that the value of property X has changed, the source bridge 464 may send a fresh value of property X message 484, 486, and 500 to the supervisory bridge 462.

The source bridge 464 may send the source building controller 466 another ReadProperty Request of property X message 496 and 500 when the timer field of the property slot has counted down to zero. At this time, the timer may be reloaded with the value stored in the interval field. In response to the messages 496 and 500, the source building controller 466 may send the source bridge 464 ReadProperty Response of property X messages 498 and 502 including the current value of property X. The source bridge 464 may continue to send fresh values of property X messages 484, 486, and 500 to the supervisory bridge 462 when the value of property X has changed by, for example, a threshold amount.

In some cases, the source controller 466 may be buffered by the source bridge 464 for one or more parameters when the source controller 466 and/or source bridge 464 is start up. In some cases, the source bridge 464 may buffer all the parameters of the source controller 466 at start-up. In this implementation, the source bridge 464 may include a cache including all of the parameters of the source controller 466 prior to receiving requests from the supervisory bridge 462. In this case, the source bridge 464 may be able to respond to the requests from the supervisory bridge 462 during the learning time without having to wait to get the parameters from the source controller 466. This may help to reduce the time required to get the parameters during first call-ups when tunneling algorithm is still learning the periodicity.

In another embodiment, the supervisory bridge 462 and/or source bridge 464 may be configured to cache one or more of the parameters from the source controllers 466 after start-up. In some cases, the supervisory bridge 462 and/or source bridge 464 may cache all of the parameters of the source controllers 466, if desired. This may enable all of the requests of the supervisory controller 460 to be responded to by the supervisory bridge 462 without having to poll the source bridge 464. This may also help to reduce the time required to get the parameters.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A building control system, comprising:
a bridge having a first port for communicating over a wired network using a wired network communications protocol and a second port for communicating over a wireless network using a wireless network communications protocol;
a building controller configured to control one or more portions of the building control system, the building controller coupled to the first port of the bridge via a wired network and configured to request data from the bridge using the wired network communications protocol;
wherein the bridge is configured to receive data from one or more remotely located building controllers via the wireless network, and for storing the data in a cache memory, the bridge is further configured to provide requested data to the building controller via the wired network upon receiving a request from the building controller; and
wherein the bridge is configured to monitor a history of requests received from the building controller, and to learn an expected next request time, so that the bridge can update the cache memory prior to receiving a subsequent request from the building controller.

2. The building control system of claim 1, wherein the bridge is configured to request data from one or more of the remotely located building controllers and store the data in the cache memory before receiving a request from the building controller for the data.

3. The building control system of claim 2 wherein the bridge responds to the request for the data from the building controller with the requested data if the requested data is already stored in the cache memory.

4. The building control system of claim 3 wherein the bridge transmits the request from the building controller to one or more remotely located building controllers over the wireless network if the requested data is not already stored in the cache memory.

5. The building control system of claim 2 wherein the bridge is configured to receive periodic updates of data from one or more remotely located building controllers and the bridge stores the updated data in the cache memory.

6. The building control system of claim 1 wherein the bridge only stores the updated data if the data has changed by a threshold amount.

7. The building control system of claim 1 wherein the bridge and building controller are integrated forming a wireless building controller.

8. The building control system of claim 1 wherein the bridge is configured to receive requests from one or more wired building controllers via the wired network.

9. The building control system of claim 8, wherein the bridge is configured to request data from one or more of the wired building controllers and store the data in the cache memory before receiving a request from the building controller for the data.

10. The building control system of claim 9 wherein the bridge responds to the request for the data from the building controller with the requested data if the requested data is already stored in the cache memory.

11. The building control system of claim 10 wherein the bridge is configured to receive periodic updates of data from one or more wired building controllers and the bridge stores the updated data in the cache memory.

12. A bridge configured to be coupled to a building controller, the bridge comprising:
a wired communication protocol task, wherein the wired communication protocol task can transmit and/or receive messages to/from a building controller;
a wireless communication protocol task, wherein the wireless communication protocol can transmit and/or receive messages over a wireless network;
a tunneling task that is configured to convert messages from the wired communication protocol to the wireless communication protocol and from the wireless communication protocol to the wired communication protocol;
a cache memory that is configured to store data received over the wireless network from one or more remotely located building controllers in order to service one or more requests of the building controller; and
a learning task that is configured to monitor a history of requests from the building controller and to determine an expected request time for a next request so that the bridge can update the cache memory just prior to receiving a subsequent request from the building controller.

13. The bridge of claim 12 wherein the bridge is a supervisory bridge and the building controller is a supervisory building controller.

14. The bridge of claim 13 wherein the bridge is configured to receive messages including data from the one or more remotely located building controllers via the wireless network and store the data in accordance with the cache memory prior to the building controller requesting the data from the bridge.

15. The bridge of claim 14 wherein the bridge is configured to receive messages from the building controller requesting data from one or more remotely located building controllers and, if the requested data is already stored in accordance with the cache memory, the bridge responds to the building controller with the requested data by accessing the cache memory.

16. The bridge of claim 14 wherein the bridge is configured to receive messages from the building controller requesting data from one or more remotely located building controllers and, if the requested data is not stored in accordance with the cache memory, the bridge transmits the message to the one or more remotely located building controllers via the wireless network.

17. The bridge of claim 14 wherein the bridge is configured to receive messages including data from the one or more remotely located building controllers via the wireless network at a request interval, wherein the request interval is based at least in part on the history of requests made by the building controller.

18. The bridge of claim 14 wherein the bridge is configured to receive messages including data from one or more wired building controllers, the bridge is configured to monitor the one or more wired building controllers for changes in data.

19. The bridge of claim 12 wherein the bridge is a source bridge.

20. The bridge of claim 19 wherein the bridge is configured to periodically request data from the building controller.

21. The bridge of claim 20 wherein the bridge transmits the data over the wireless network at a request interval.

22. The bridge of claim 21 wherein the bridge compares currently requested data to previously requested data, and if the data has not changed by a threshold amount, the bridge does not transmit the data across the wireless network.

23. A building control system, comprising:
a supervisory controller configured to control one or more portions of a building control system, wherein the supervisory controller is configured to communicate using a wired communication protocol;
a supervisory bridge coupled to the supervisory controller via a wired network and configured to communicate with the supervisory controller via a wired communication protocol;
the supervisory bridge further configured to convert the wired communication protocol to a wireless communication protocol for wireless communication;
a remotely located building controller configured to communicate using a wired communication protocol;
a source bridge connected to the remotely located building controller via a wired network and configured to communicate with the remotely located building controller via a wired communication protocol;
the source bridge further configured to communicate with the supervisory bridge using the wireless communication protocol;
wherein the supervisory bridge includes a cache memory for storing data relating to the remotely located building controller received from the source bridge; and
the supervisory bridge and/or the source bridge configured to transmit data to the cache memory of the supervisory bridge before the supervisory controller requests the data, wherein the source bridge transmits updated data to the supervisory bridge at an interval that is learned based at least in part on a history of requests made by the supervisory controller.

24. The building control system of claim 23 wherein the source bridges only transmits the update data if the data has changed by a threshold amount.

25. The building control system of claim 23 wherein the supervisory bridge responds to at least some of the requests by the supervisory controller with the data stored in the cache memory of the supervisory bridge.

26. A bridge configured to be coupled to a building controller, the bridge comprising:
a wired communication protocol task, wherein the wired communication protocol task can transmit and/or receive messages from a building controller;
a wireless communication protocol task, wherein the wireless communication protocol can transmit and/or receive messages over a wireless network;
a tunneling task that is configured to convert messages from the wired communication protocol to the wireless communication protocol and from the wireless communication protocol to the wired communication protocol;
wherein the tunneling task includes a cache memory that is configured to store data received from the building controller; and
wherein the bridge is configured to automatically request data from the building controller and transmit the requested data over the wireless network at intervals that are based, at least in part, on a history of requests for the requested data.

27. The bridge of claim 26 wherein the bridge compares currently requested data to previously requested data, and if the data has not changed by a threshold amount, the bridge does not transmit the data across the wireless network.

28. The bridge of claim 26 wherein the bridge is configured to receive messages including data from the building controller via the wired network and store the data in accordance with the cache memory prior to receiving a request from remotely located building controller over the wireless network.

29. The bridge of claim 28 wherein the messages including data from the building controller includes all the parameters of the building controller.

30. A building controller, comprising:
a first port for communicating over a wired network using a wired network communications protocol,
a second port for communicating over a wireless network using a wireless network communications protocol, wherein the second port is configured to receive data from one or more remotely located building controllers via the wireless network;
a tunneling task block connected to the first port and to the second port, the tunneling task block configured to convert the wired network communication protocol to wireless network communication protocol and wireless network communication protocol to wired network communication protocol, the tunneling task block including a cache memory for storing data;
a controller block configured to control one or more portions of the building control system, the controller block coupled to the first port and configured to request data from the tunneling task block using the wired network communications protocol and/or to send data to the tunneling task block in response to a request from the tunneling task block for data using the wired network communications protocol;

wherein the tunneling task block is further configured to provide requested data to the controller block upon receiving a request from the controller block and/or store requested data in the cache memory upon receiving a response from the controller block; and wherein the tunneling task block includes a learning mechanism that is configured to monitor the received requests from the controller block and learn an expected request interval for the receiving the request from the controller block based on the history of the requests.

* * * * *